(12) United States Patent
Ishida

(10) Patent No.: US 8,127,906 B2
(45) Date of Patent: Mar. 6, 2012

(54) CLUTCH DRIVE DEVICE AND VEHICLE EQUIPPED WITH THE SAME

(75) Inventor: Yousuke Ishida, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 536 days.

(21) Appl. No.: 12/264,214

(22) Filed: Nov. 3, 2008

(65) Prior Publication Data
US 2009/0127063 A1 May 21, 2009

(30) Foreign Application Priority Data

Nov. 15, 2007 (JP) ................................. 2007-296468

(51) Int. Cl.
*F16D 19/00* (2006.01)
*F16D 23/12* (2006.01)
(52) U.S. Cl. ........... 192/20; 192/84.6; 192/84.7; 192/90
(58) Field of Classification Search .................. None
See application file for complete search history.

(56) References Cited

U.S. PATENT DOCUMENTS

| | | | | |
|---|---|---|---|---|
| 4,852,419 A | * | 8/1989 | Kittel et al. ................ | 74/89.14 |
| 5,695,037 A | * | 12/1997 | Borschert et al. ............ | 192/84.1 |
| 5,984,072 A | | 11/1999 | Leimbach et al. | |
| 2006/0169562 A1 | * | 8/2006 | Kosugi ............................ | 192/83 |
| 2006/0169569 A1 | | 8/2006 | Ooishi et al. | |

FOREIGN PATENT DOCUMENTS

| | | | |
|---|---|---|---|
| EP | 1 348 880 A1 | | 10/2003 |
| EP | 1403545 A1 | * | 3/2004 |
| JP | 2005-326018 | | 11/2005 |
| JP | 2007-069638 | | 3/2007 |

OTHER PUBLICATIONS

European Search Report, Feb. 19, 2009, for European Patent Application No. EP 08 25 3716.

* cited by examiner

*Primary Examiner* — David D Le
*Assistant Examiner* — Jacob S Scott
(74) *Attorney, Agent, or Firm* — Dickstein Shapiro LLP

(57) ABSTRACT

A clutch drive device includes an actuator for generating a drive force for driving a clutch, a first solid of revolution, a mechanism for transmitting the drive force of the actuator to the clutch, and an assist spring unit having one end pivotally supported and another end abutting on the solid of revolution. An abutment structure in which the first solid of revolution abuts on the assist spring unit is configured so that an urging force of the assist spring does not act in a direction of rotating the first solid of revolution at least at one position in a play area in which the clutch is not disengaged even if the first solid of revolution rotates.

23 Claims, 18 Drawing Sheets

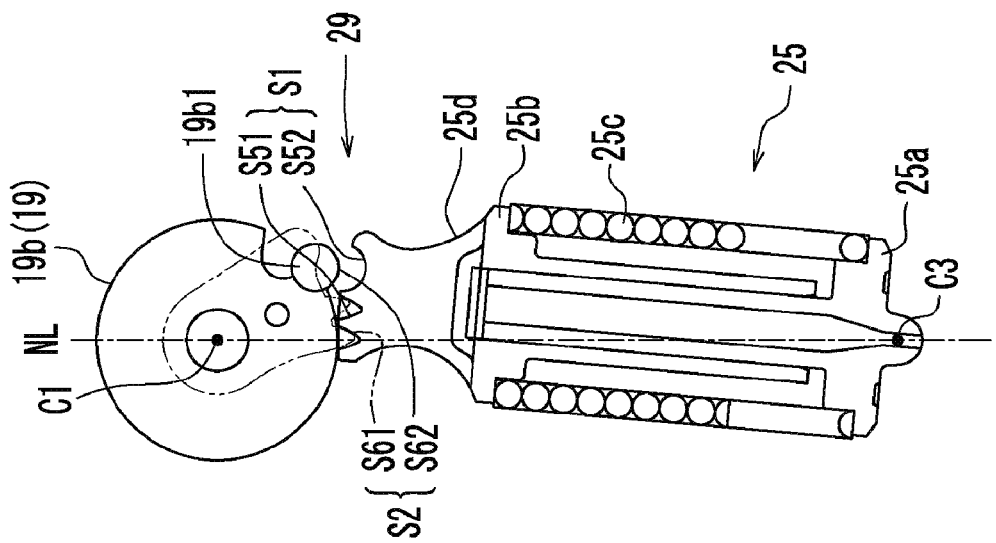
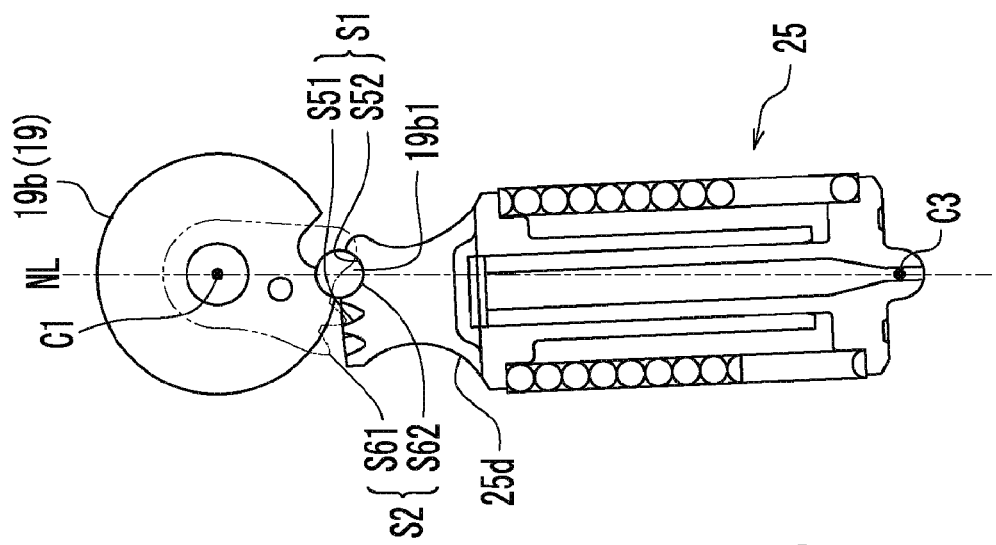
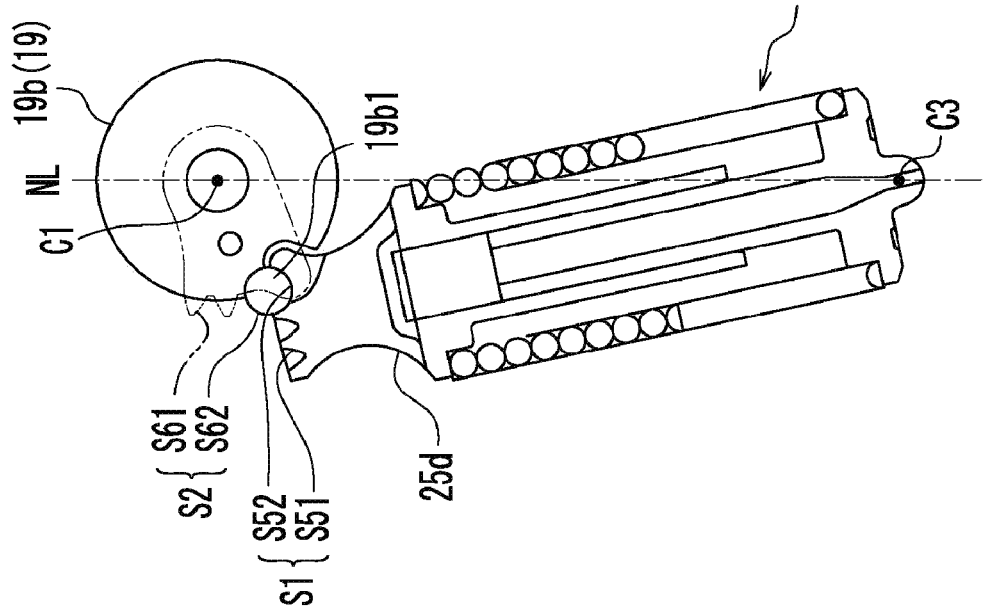

CLUTCH DRIVE DEVICE AND VEHICLE EQUIPPED WITH THE SAME

PRIORITY INFORMATION

This patent application claims priority under 35 U.S.C. §119 to Japanese Patent Application No. 2007-296468, filed on Nov. 15, 2007, the entire contents of which is hereby expressly incorporated by reference.

TECHNICAL FIELD

The present invention relates to a clutch drive device and a vehicle equipped with the same. Certain embodiments of the present invention further relate clutch drive devices that drive a clutch using a drive force of an actuator.

BACKGROUND ART

There is conventionally known a clutch operation assisting device that uses an urging force, such as a spring force, for assisting in manual clutch engagement/disengagement operation (see, for example, Japanese Patent Publication 2005-326018). The clutch operation assisting device described in Japanese Patent Publication 2005-326018 is interposed between a clutch lever and a clutch and reduces the force required to operate the clutch lever.

As shown in FIG. 18a, the clutch operation assisting device described in Japanese Patent Publication 2005-326018 includes a compression coil spring 234 and a spring holder 253 that supports the compression coil spring 234 and expands or compresses in a longitudinal direction according to the compression coil spring 234. The base of the spring holder 253 is formed to pivot about a pivot support point C1 and a tip end of the spring holder 253 is connected to a lever 238 via a connection pin 241. The lever 238 is arranged in a drive force transmission system between the clutch lever and the clutch and rotates about a spindle 243. In FIGS. 18a to 18c, if the clutch lever is operated in a direction of disengaging the clutch, the lever 238 rotates clockwise. If the clutch lever is operated in a direction of engaging the clutch, the lever 238 rotates counterclockwise.

A so-called "play area", in which a load from the clutch (hereinafter, "clutch load") is not applied to the clutch lever even if the rider grips the clutch lever, is provided in the clutch. In the play area, even if the rider grips the clutch lever, the clutch is not disengaged. A position where the clutch starts to be disengaged is called a "meet point" (that is, "disengagement start position"). After the lever 238 exceeds the meet point, the clutch load is applied to the clutch lever. Accordingly, in the clutch operation assisting device, the assisting force of the compression coil spring 234 is zero at the meet point and acts in the direction of disengaging the clutch while the clutch lever is operated in the direction of disengaging the clutch after the lever exceeds the meet point.

Specifically, as shown in FIG. 18b, at the meet point, a line L1 connecting the pivot support point C1 of the spring holder 253 and a center of the connection pin 241 coincides with a line L2 connecting the pivot support point C1 to a center of rotation of the lever 238 (that is, the center of the spindle 243). Due to this, the assisting force of the compression coil spring 234 is zero.

As shown in FIG. 18c, while the lever 238 exceeds the meet point and moves toward the clutch disengagement side, the line L1 moves below of the line L2 and the biasing force of the compression coil spring 234 acts as an assisting force for rotating the lever 238 clockwise (that is, in the direction of disengaging the clutch).

On the other hand, as shown in FIG. 18a, in the play area, the line L1 deviates above the line L2 and the urging force of the compression coil spring 234 acts in the direction of rotating the lever 238 counterclockwise, that is, in the direction of engaging the clutch. As a result, the biasing force of the compression coil spring 234 acts as a force for applying a load to the rider who grips the clutch lever (hereinafter, "reverse assisting force") in the play area. Therefore, a canceling compression coil spring 235 that applies a biasing force to the lever 238 when rotated within the play area is separately provided in the clutch operation assisting device so as to cancel the reverse assisting force.

As can be seen, the clutch operation assisting device is a device for assisting in the rider's manual clutch operation. On the other hand, devices for performing clutch disengagement and engagement operations using an actuator such as an electric motor (hereinafter, "clutch drive devices") are also known. For example, Japanese Patent Publication 2007-069638 discloses a clutch drive device which includes a compression coil spring that generates the assisting force needed to lessen the load on the clutch actuator. This type of clutch drive device, however, also generates a reverse assisting force caused by the compression coil spring in a play area. Consequently, an unnecessarily excessive load is applied to the actuator in the play area. To lessen the load on the actuator, therefore, a canceling compression coil spring is separately provided in the clutch drive device. Separately providing the canceling compression coil spring in the clutch drive device, however, disadvantageously entails an increase in the number of components, a complicated structure, and a cost increase.

SUMMARY

An object of the present invention is to provide a clutch drive device capable of suppressing the reverse assisting force in the play area without the use of a separate canceling compression coil spring.

A clutch drive device according to one embodiment of the present invention comprises a clutch, a clutch actuator that generates a drive force for engaging or disengaging the clutch, and a drive force transmission mechanism including a solid of revolution which rotates in a first direction when the clutch is disengaged and in a second, opposite direction when the clutch is engaged. The drive force transmission mechanism is configured to transmit the drive force of the actuator to the clutch. The clutch drive device also includes an auxiliary elastic body having one end pivotally supported and another end abutting on the solid of revolution. The auxiliary elastic body urges the solid of revolution in a direction of disengaging the clutch after the clutch starts to disengage. An abutment structure in which the solid of revolution abuts on the auxiliary elastic body is configured so that a biasing force of the auxiliary elastic body does not act in a direction of rotating the solid of revolution at least at one position in a play area in which the clutch is not disengaged even if the solid of revolution rotates.

In the clutch drive device, the auxiliary elastic body and the solid of revolution are not conventionally connected to each other by a pin, but abut on each other so that the biasing force of the auxiliary elastic body does not act in the direction of rotating the solid of revolution at least at one position in the play area. Consequently, when compared with the conventional technique in which the reverse assisting force is generated in the entire play area, the reverse assisting force can be reduced in the play area on the average. It is, therefore, possible to lessen the load on the clutch actuator without providing a canceling compression coil spring. Because the clutch is disengaged by the actuator, unlike in a vehicle in which the clutch is disengaged using a clutch lever or the like, the problem of impairing the rider's sense of operation does not occur. Therefore, even if the above-stated structure is provided in the play area, no problem occurs practically.

According to the present invention, the clutch drive device can suppress the reverse assisting force in the play area without the provision of a canceling compression coil spring.

BRIEF DESCRIPTION OF THE DRAWINGS

FIGS. 17a to 17c are schematic views showing an abutment structure in which a first solid of revolution abuts an assist spring unit in various stages of abutment according to a third embodiment.

DETAILED DESCRIPTION

Embodiments of the present invention are described hereinafter in detail with reference to the accompanying drawings.

First Embodiment

Motorcycle

Figure 1:
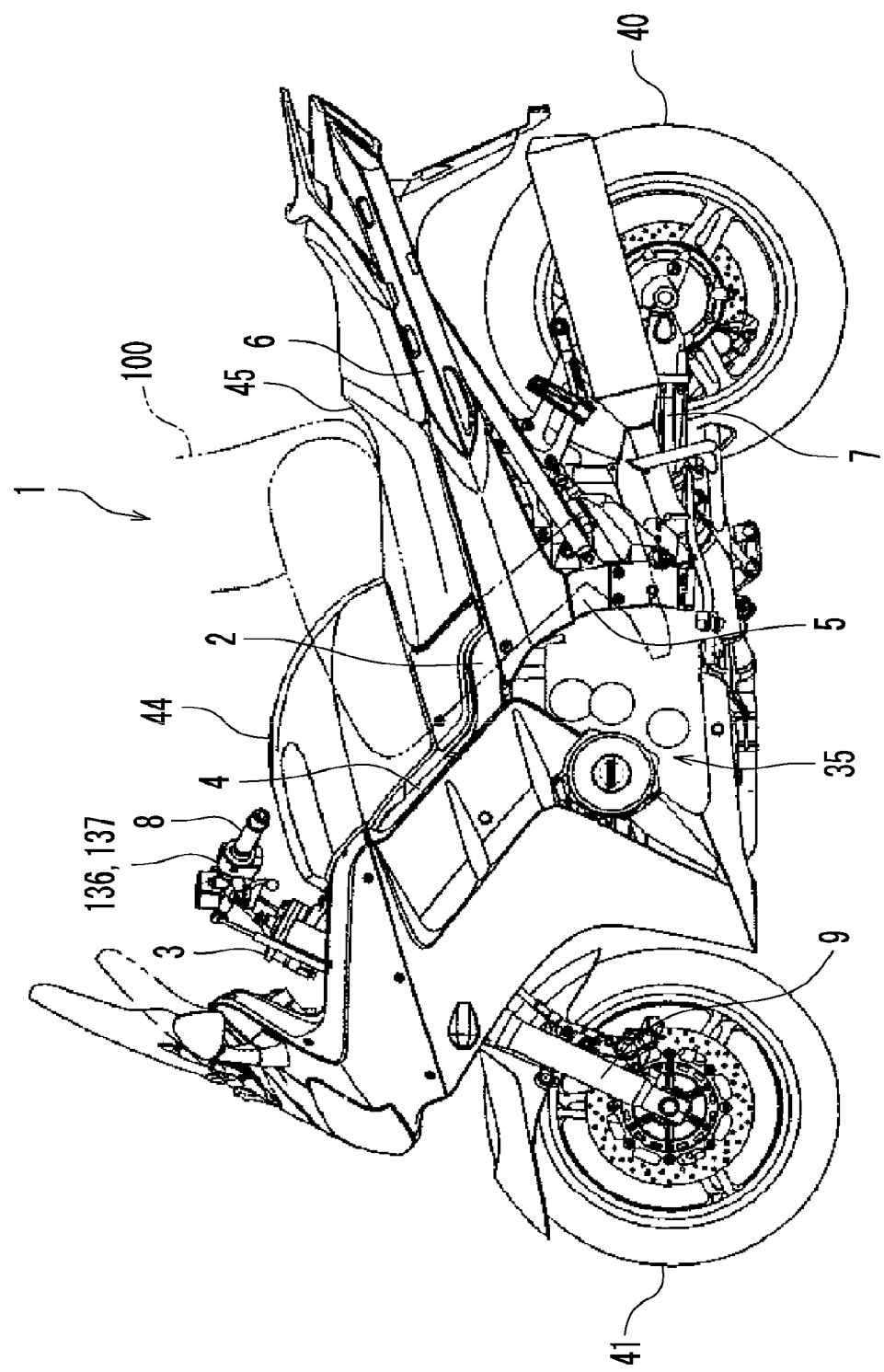
FIG. 1 is a side view of a motorcycle.

FIG. 1 is a side view of a motorcycle 1 according to a first embodiment of the present invention. As shown in FIG. 1, the motorcycle 1 of the embodiment includes a body frame 2. The body frame 2 comprises a head pipe 3, a main frame 4 extending rearward of the head pipe 3, and a rear arm bracket 5 extending downward of a rear portion of the main frame 4. A front fork 9 is supported on the head pipe 3. A steering handle 8 is provided on an upper end of the front fork 9 and a front wheel 41 is provided on a lower end thereof. A fuel tank 44 is arranged in an upper portion of the main frame 4 and a seat 45 is arranged in rear of the fuel tank 44. The seat 45 is mounted on a seat rail 6. A power unit 35 is suspended on the main frame 4 and the rear arm bracket 5. A front end of a rear arm 7 is vertically pivotally supported on the rear arm bracket 5. A rear wheel 40 is supported on a rear end of the rear arm 7.

Figure 2:
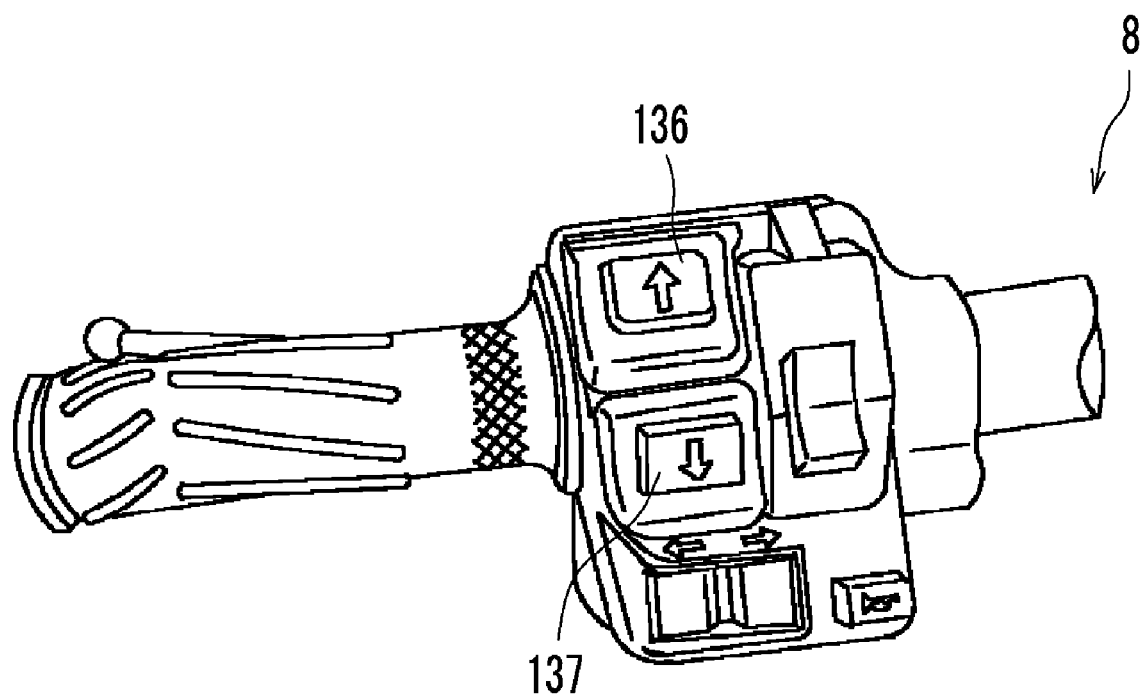
FIG. 2 is a perspective view of automatic transmission operation switches of the motorcycle of FIG. 1.

The steering handle 8 includes automatic transmission operating switches 136 and 137 operated by a rider 100 who sits astride the seat 45 (see FIG. 2).

Power Unit

Figure 3:
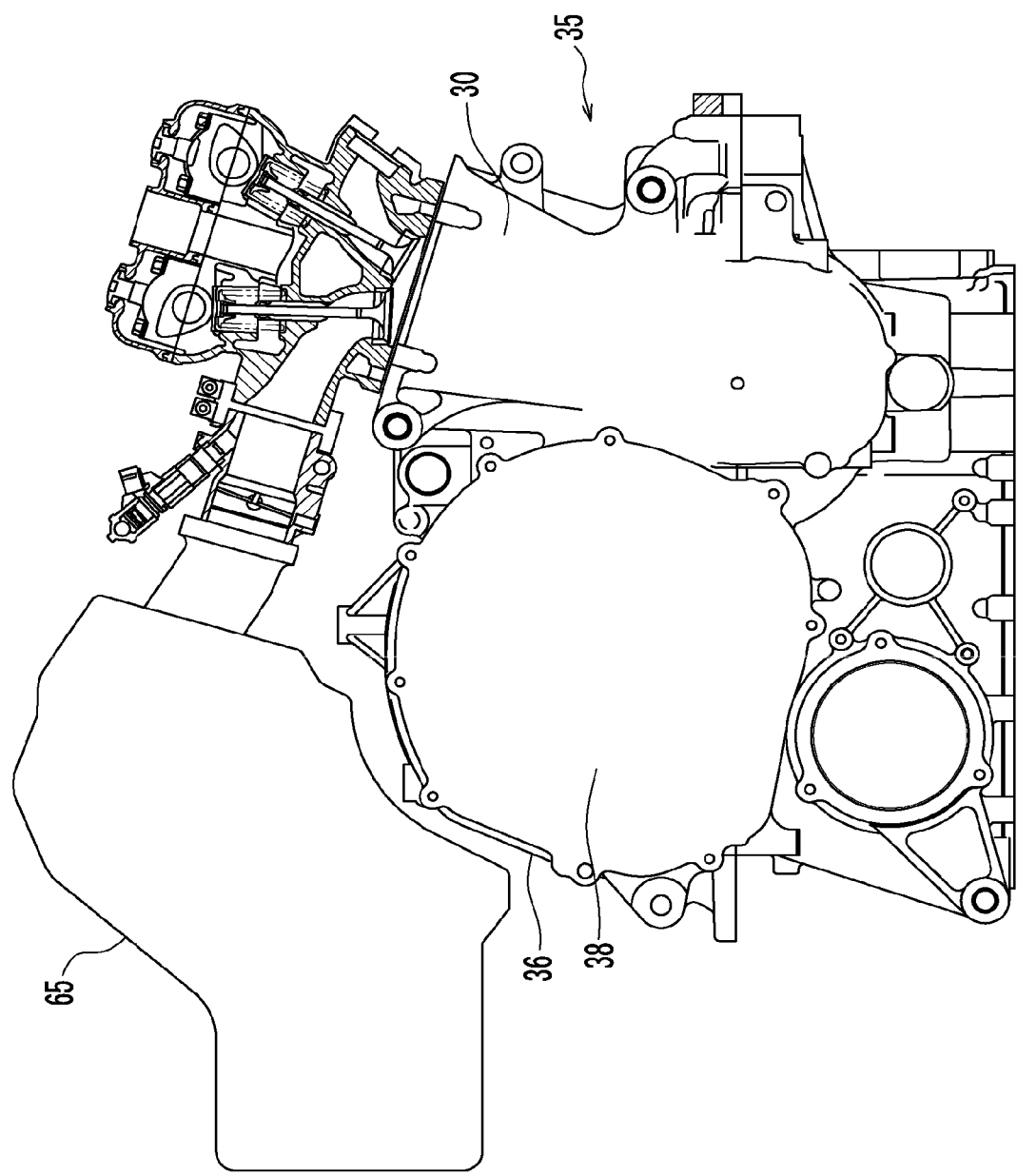
FIG. 3 is a right side view of a power unit of the motorcycle of FIG. 1.

FIG. 3 is a right side view of the power unit 35. In FIG. 3, reference numeral 65 denotes an air cleaner.

Figure 4:
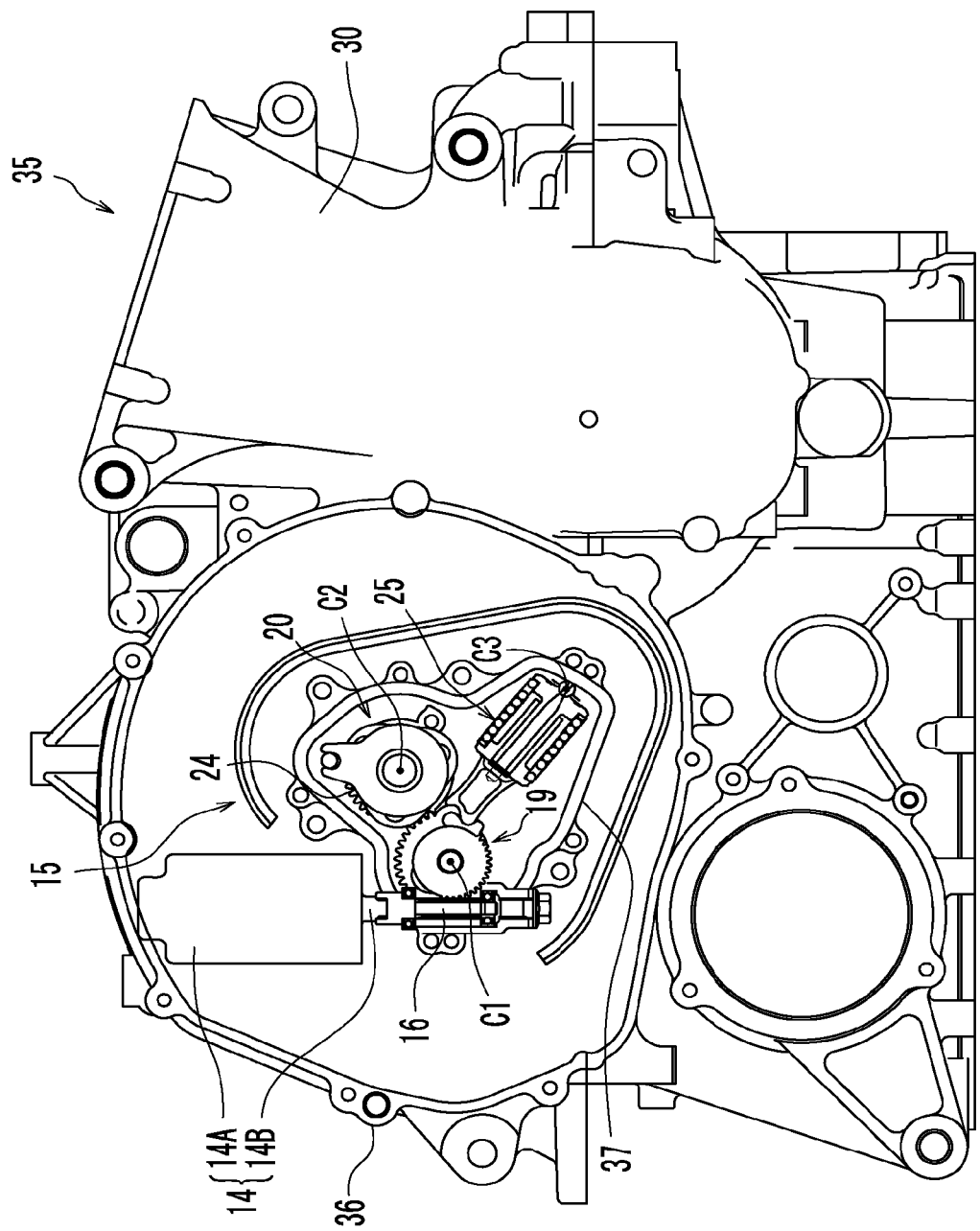
FIG. 4 is a right side view of the power unit of FIG. 3 with the cover 38 removed to show a drive force transmission mechanism.

FIG. 4 is a right side view of the main constituent elements of the power unit 35 in a state in which a cover 38 (FIG. 3) and a case cover 32 (FIG. 5) have been removed.

Figure 5:
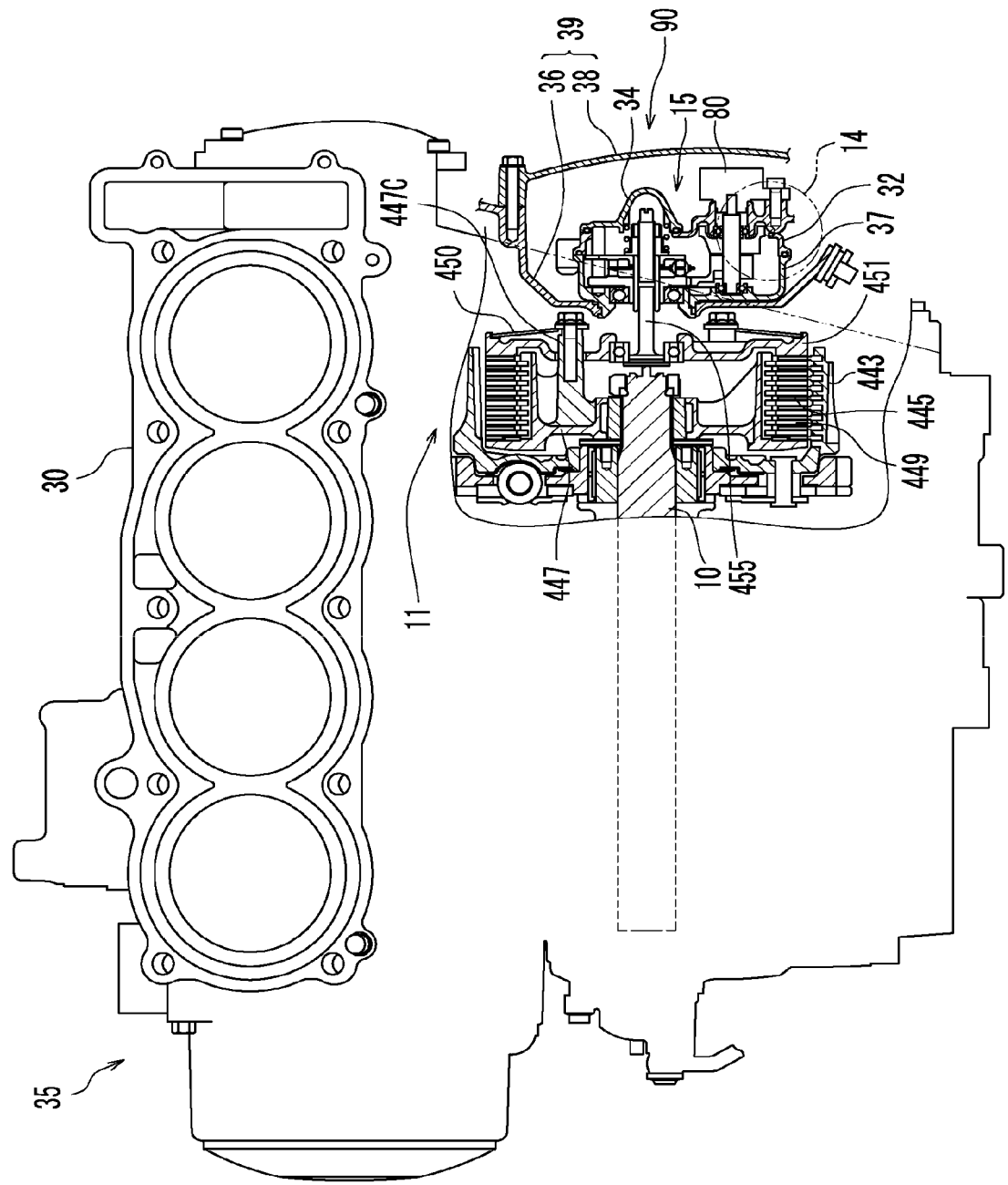
FIG. 5 is a top plan view of the power unit of FIG. 3 in which portions of the power unit have been removed or cutaway.

FIG. 5 is a partially cutout plan view of the power unit 35 in which portions of the power unit have been removed or cutaway for clarity.

Figure 6:
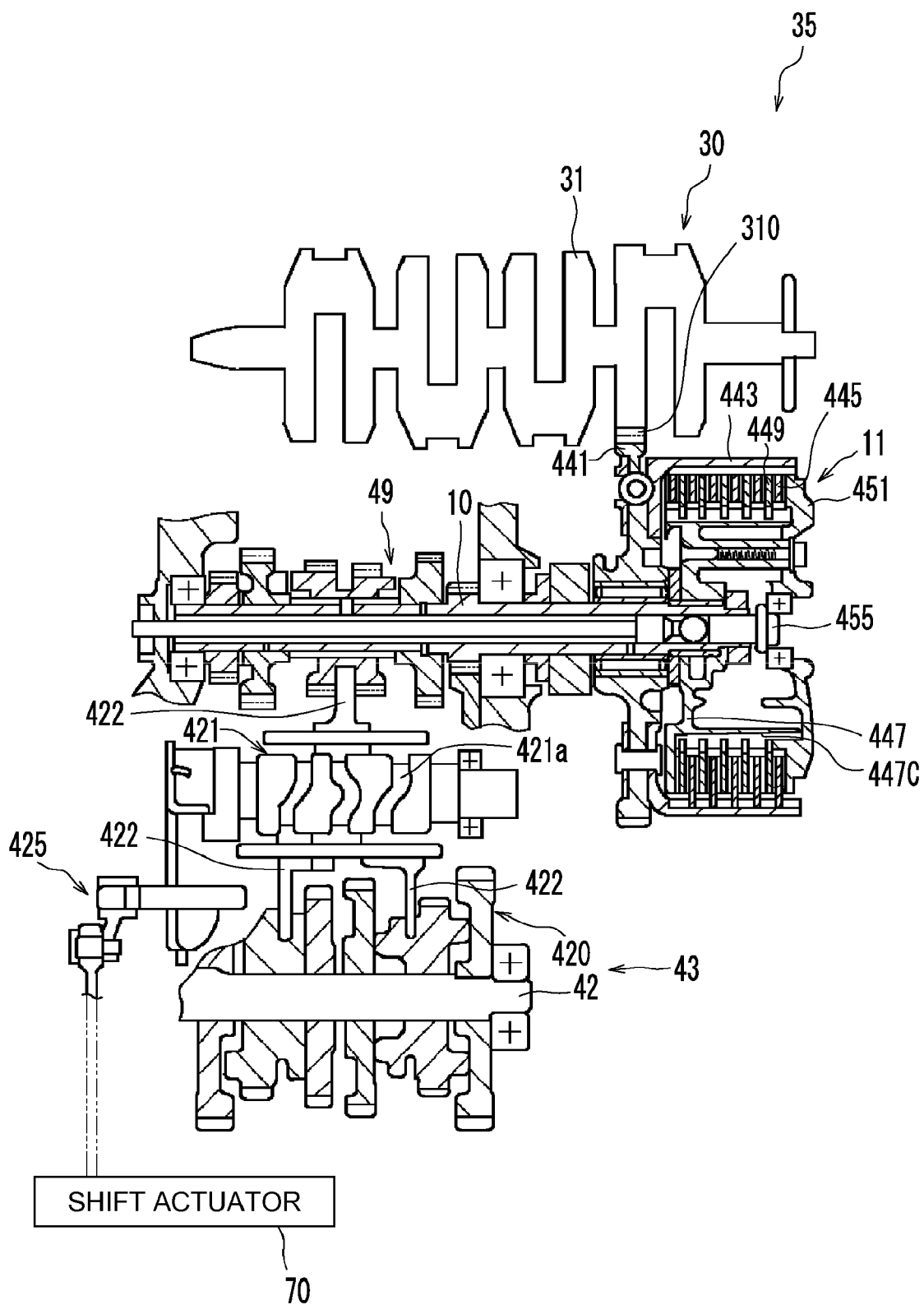
FIG. 6 is a schematic view showing the main components of the power unit of FIG. 3.

FIG. 6 is a schematic view showing an internal configuration of the power unit 35. As shown in FIG. 6, the power unit 35 includes an engine 30, a clutch 11, and a transmission 43. The power unit 35 also includes a clutch actuator 14 (see FIG. 4) for engaging and disengaging the clutch 11 and a shift actuator 70 for actuating the transmission 43.

Engine

In the present embodiment, the engine 30 is a water-cooled, transverse four-stroke and parallel four-cylinder engine. Engine 30, however, is not limited to an internal combustion engine, such as a gasoline engine, but may comprise any suitable engine, including an electric motor engine. Furthermore, the engine 30 may comprise a combination of a gasoline engine and an electric motor engine. The engine 30 has a crankshaft 31 which extends in the crosswise direction of motorcycle 1. A gear 310 is formed on the crankshaft 31.

Clutch

As shown in FIG. 6, the clutch 11 according to the present embodiment is a multiplate friction clutch. However, clutch 11 is not limited to a multiplate friction clutch configuration. Other suitable clutch configurations may also be utilized. The clutch 11 has a clutch housing 443, a plurality of friction plates 445 which are integrally disposed on the clutch housing 443, a clutch boss 447, a plurality of clutch plates 449 which are formed integrally with the clutch boss 447, and a pressure plate 451 which generates pressurized contact between the friction plates 445 and the clutch plates 449.

A gear 441, rotatable about a main shaft 10, is supported on the main shaft 10. This gear 441 is operatively engaged with the gear 310 of the crankshaft 31. The clutch housing 443 is fixed to the gear 441 and rotates integrally with the gear 441. Accordingly, torque is transmitted to the clutch housing 443 from the crankshaft 31 via the gear 441.

As shown in FIG. 5, a plurality of cylindrical guiding portions 447C, which are integrally formed with the cylindrical clutch boss 447 and which extend in the axial direction of the main shaft 10, are arranged inside the cylindrical clutch boss 447. A spring 450, which comprises a disc spring, is attached to the guiding portion 447C. The spring 450 urges the pressure plate 451 leftward in FIG. 5. In other words, the spring 450 urges the pressure plate 451 in the direction of engagement of the clutch 11.

Pressure plate 451 is driven by the clutch actuator 14 and moved in the axial direction of a slide shaft 455. When the clutch 11 is engaged, the slide shaft 455 moves to the left in FIG. 5 and the pressure plate 451 also moves leftward in a similar fashion. As a result, the pressure plate 451, which receives the urging force of the spring 450, forces friction plate 445 to press onto clutch plate 449. Accordingly, friction force is generated between the friction plate 445 and the clutch plate 449, thereby drive force is transmitted from the clutch housing 443 to the clutch boss 447 in the clutch 11.

On the other hand, when the clutch 11 is disengaged, the slide shaft 455 moves to the right in FIG. 5 and the pressure plate 451 also moves rightward in FIG. 5 against the urging force of the spring 450. As a result, the pressed contact state between the friction plate 445 and the clutch plate 449 is released. Accordingly, drive force is not transmitted from the clutch housing 443 to the clutch boss 447 in the clutch 11.

In this manner, depending on the magnitude of the drive force of the clutch actuator 14 and the biasing force of the spring 450, the pressure plate 451 moves toward or away from main shaft 10. According to this movement, the clutch 11 goes into an engaged state or a disengaged state.

Transmission

As shown in FIG. 6, the transmission 43 includes the main shaft 10, which is arranged parallel to the crankshaft 31 of the engine 30, and a drive shaft 42 which is also arranged parallel to the main shaft 10. Multistage transmission gears 49 are disposed on the main shaft 10. Multistage transmission gears 420 are disposed on the drive shaft 42. A transmission gear 49 on the main shaft 10 engages with a transmission gear 420 on the drive shaft 42. Here, in FIG. 6, the transmission gears 49 and the transmission gears 420 are illustrated as being separated. Except for a selected pair of transmission gears, either or both of the transmission gears 49 and the transmission gears 420 are arranged so as to be in a condition of idling rotation (that is, a condition of free rotation) relative to the main shaft 10 or the drive shaft 42. Accordingly, the transmission of torque from the main shaft 10 to the drive shaft 42 is performed only via the selected pair of the transmission gears.

The gear change operation for selecting a pair of transmission gears 49 and 420 and changing a transmission gear ratio is performed by the rotation of a shift cam 421. The shift cam 421 has a plurality of cam grooves 421a and a shift fork 422 is attached to each of the cam grooves 421a. Each of the shift forks 422 engages a predetermined transmission gear 49 and transmission gear 420 of the main shaft 10 and the drive shaft 42, respectively. Due to the rotation of the shift cam 421, the shift forks 422 are guided by the cam grooves 421a and move in the direction of each axis. As a result, only a single pair of the transmission gears 49 and the transmission gears 420 at the positions which correspond to a rotational angle of the shift cam 421 are in a fixed state respectively to the main shaft 10 and the drive shaft 42 by a spline. Positions of the transmission gears are thereby determined and the torque is transmitted between the main shaft 10 and the drive shaft 42 at a predetermined transmission gear ratio via the transmission gear 49 and the transmission gear 420.

A shift actuator 70 is operatively connected to the shift cam 421 via a connecting mechanism 425. The type of shift actuator 70 used is not limited to any specific embodiment. For example, an electric motor and the like may be utilized. The shift actuator 70 rotates the shift cam 421 via the connecting mechanism 425 and performs a gear change operation.

Clutch Actuator and Drive Force Transmission Mechanism

The clutch actuator 14, which generates the drive force needed to perform disengagement and engagement of the clutch 11, and a drive force transmission mechanism 15, which transmits the drive force of the clutch actuator 14, are explained.

As shown in FIG. 4 and FIG. 5, the clutch actuator 14 and the drive force transmission mechanism 15 are arranged inside a casing 39 of the power unit 35. Specifically, as shown in FIG. 5, the casing 39 of the power unit 35 includes a crankcase 36 which accommodates the crankshaft 31 and the clutch 11, and a cover 38 which covers a portion of the right end of the crankcase 36. The clutch actuator 14 and the drive force transmission mechanism 15 are arranged outside the crankcase 36 and inside the cover 38. In other words, the clutch actuator 14 and the drive force transmission mechanism 15 are covered by the cover 38 on the outside of the crankcase 36.

The clutch actuator 14 and the drive force transmission mechanism 15 are arranged at one end in the crosswise direction in the casing 39. The clutch actuator 14 and the drive force transmission mechanism 15 may be arranged at either the left end or the right end of the transmission 43 in the casing 39. In the present embodiment, the clutch actuator 14 and the drive force transmission mechanism 15 are arranged at the right end of the transmission 43 in the casing 39. Further, in the present embodiment, the clutch actuator 14 and the drive force transmission mechanism 15 are arranged at the side where the clutch 11 is arranged in the crosswise direction. However, it is also possible to arrange the clutch actuator 14 and the drive force transmission mechanism 15 on the side of the transmission 43 which is opposite in the crosswise direction to the side where the clutch 11 is arranged.

As shown in FIG. 4, the clutch actuator 14, according to the present embodiment, includes an electric motor. The clutch actuator 14 has a motor body 14A which is approximately cylindrical in shape and a drive shaft 14B which projects downward from the motor body 14A. The clutch actuator 14 is arranged so that the motor body 14A and the drive shaft 14B extend vertically.

Figure 7A:
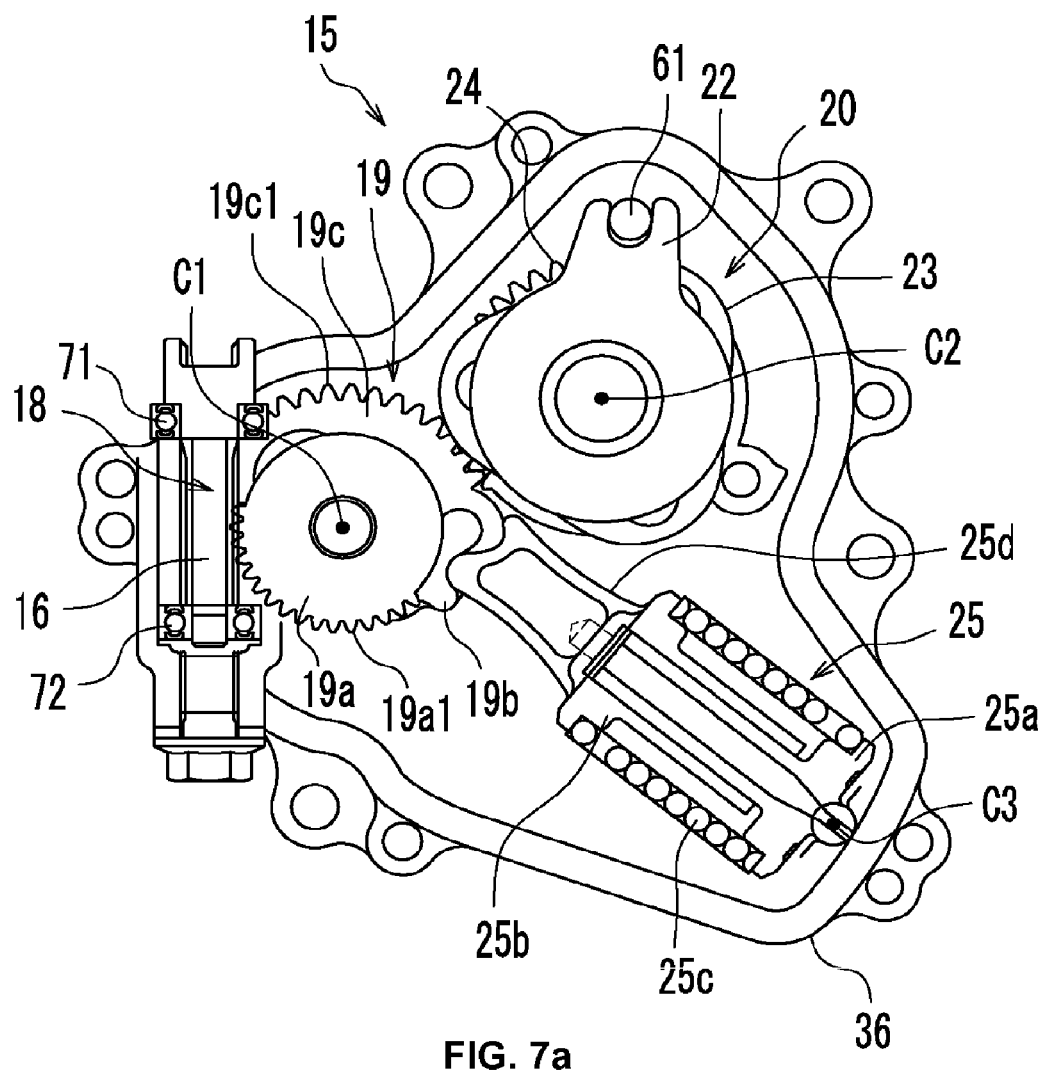
FIG. 7a is an enlarged right side view of an drive force transmission mechanism in a clutch engagement state.

As shown in FIGS. 4 and 7a, the drive force transmission mechanism 15 includes a worm shaft 16, which is connected to the drive shaft 14B of the clutch actuator 14, a first solid of revolution 19, which engages with the worm shaft 16, a second solid of revolution 24 which engages with the first solid of revolution 19 (see FIG. 9) and a ball cam 20 which converts the torque of the second solid of revolution 24 into a force in the axial direction of the slide shaft 455. Here, as described below, in the present embodiment, the second solid of revolution 24 constitutes a part of the ball cam 20. However, it is also possible to separate the second solid of revolution 24 from the ball cam 20.

The worm shaft 16 extends in the vertical direction. A helical groove is formed on the outer peripheral surface of the worm shaft 16. The worm shaft 16 is rotatably supported by bearings 71, 72. In the present embodiment, the drive shaft 14B of the clutch actuator 14 and the worm shaft 16 are configured as separate components. However, it is also possible that the drive shaft 14B and the worm shaft 16 are integrated.

Figure 8:
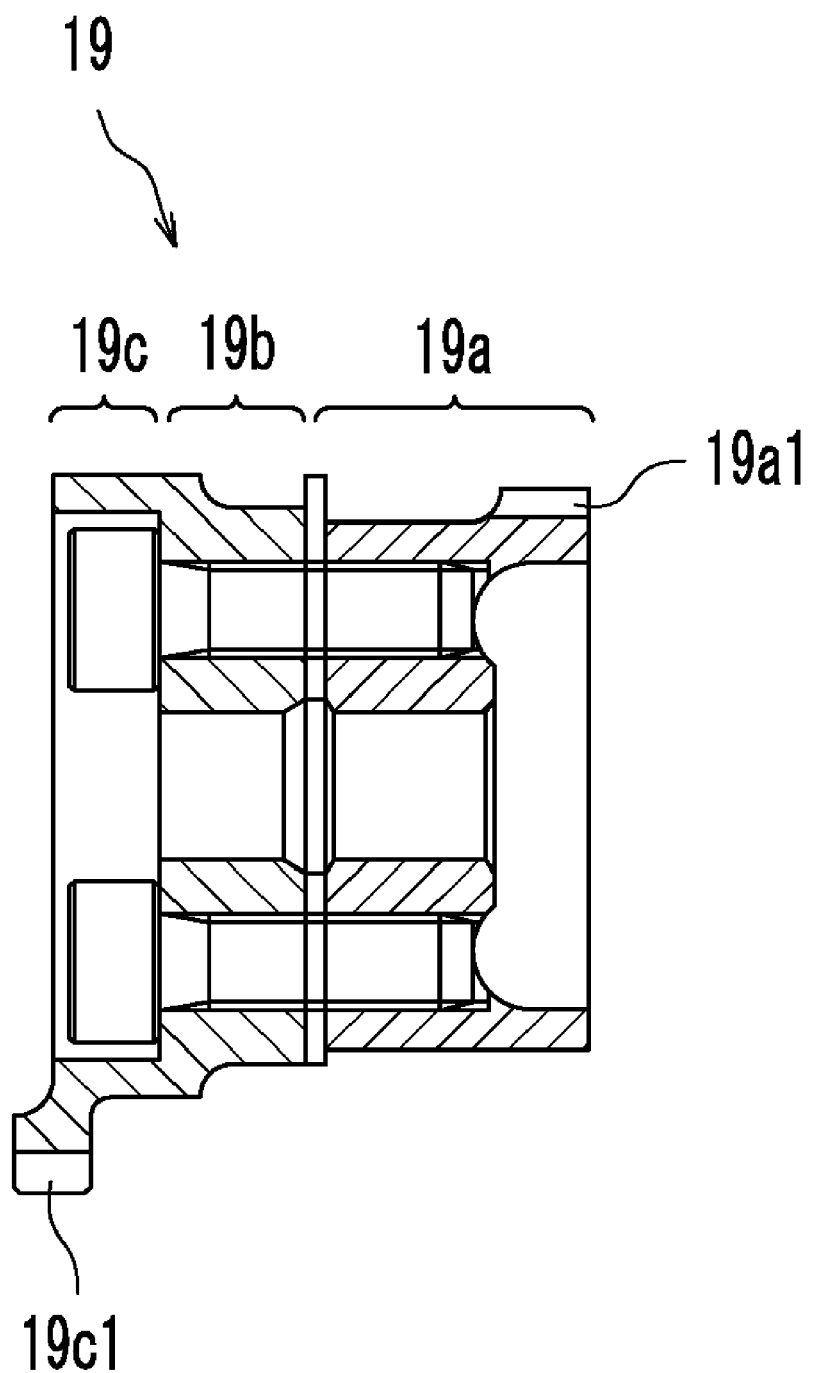
FIG. 8 is a cross-sectional view of a first solid of revolution of the drive force transmission mechanism.

As shown in FIGS. 7a and 8, the first solid of revolution 19 includes a worm wheel portion 19a, a cam portion 19b and a gear portion 19c in this order from the right side to the left side (or from the front face to the back face of the sheet in FIG. 7a). As shown in FIG. 7a, a plurality of teeth 19a1 are formed on an outer peripheral portion of worm wheel portion 19a. The worm wheel portion 19a is engaged with the worm shaft 16. Accordingly, the torque of the worm shaft 16 is transmitted to the worm wheel portion 19a, and the first solid of revolution 19 rotates in accordance with the worm shaft 16. The worm shaft 16 and the worm wheel portion 19a of the first solid of revolution 19 together constitute a worm gear 18.

The cam portion 19b of the first solid of revolution 19 is in contact with a corresponding abutment portion 25d of an assist spring unit 25 (FIG. 7a) which is described hereinbelow.

Teeth 19c1 are formed on an outer peripheral portion of gear portion 19c of the first solid of revolution 19. The radius of the gear portion 19c (to be exact, the distance from the axis of rotation C1 of the first solid of revolution 19 to the teeth 19c1) is greater than the radius of the worm wheel portion 19a (to be exact, the distance from the axis of rotation C1 of the first solid of revolution 19 to the teeth 19a1). However, the difference in length between the radius of the gear portion 19c and the radius of the worm wheel portion 19a may be reversed. In another alternative, the radius of the gear portion 19c and the radius of the worm wheel portion 19a may be equal to each other.

Figure 10:
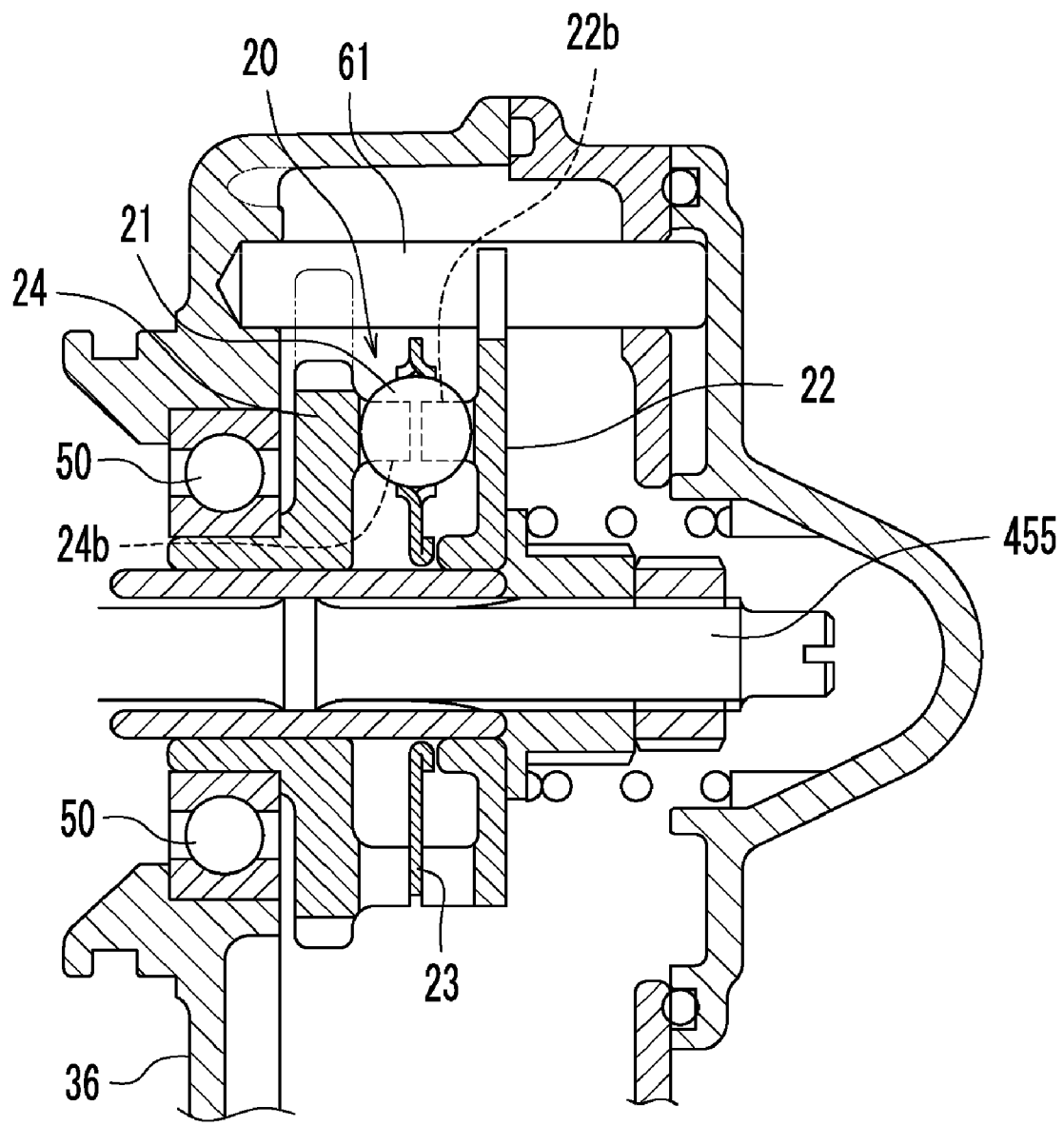
FIG. 10 is a cross-sectional view of the ball cam in a clutch engagement state.

As shown in FIG. 7a and FIG. 10, the ball cam 20 includes a cam plate 22, a ball plate 23 and the second solid of revolution 24 in this order from the right side to the left side (or from the front face to the back face of the sheet in FIG. 7a).

The cam plate 22 is fixed to the slide shaft 455 and is movable in the axial direction of the slide shaft 455 in an integral fashion with the slide shaft 455. However, rotation of the cam plate 22 around the slide shaft 455 is restricted by a stopper pin 61.

The ball plate 23 supports three balls 21 which are arranged at even intervals in a peripheral direction so as to be able to roll. However, the number of balls 21 in ball cam 20 does not have to be limited to three. Other suitable ball cam configurations may be utilized as needed.

Figure 9:
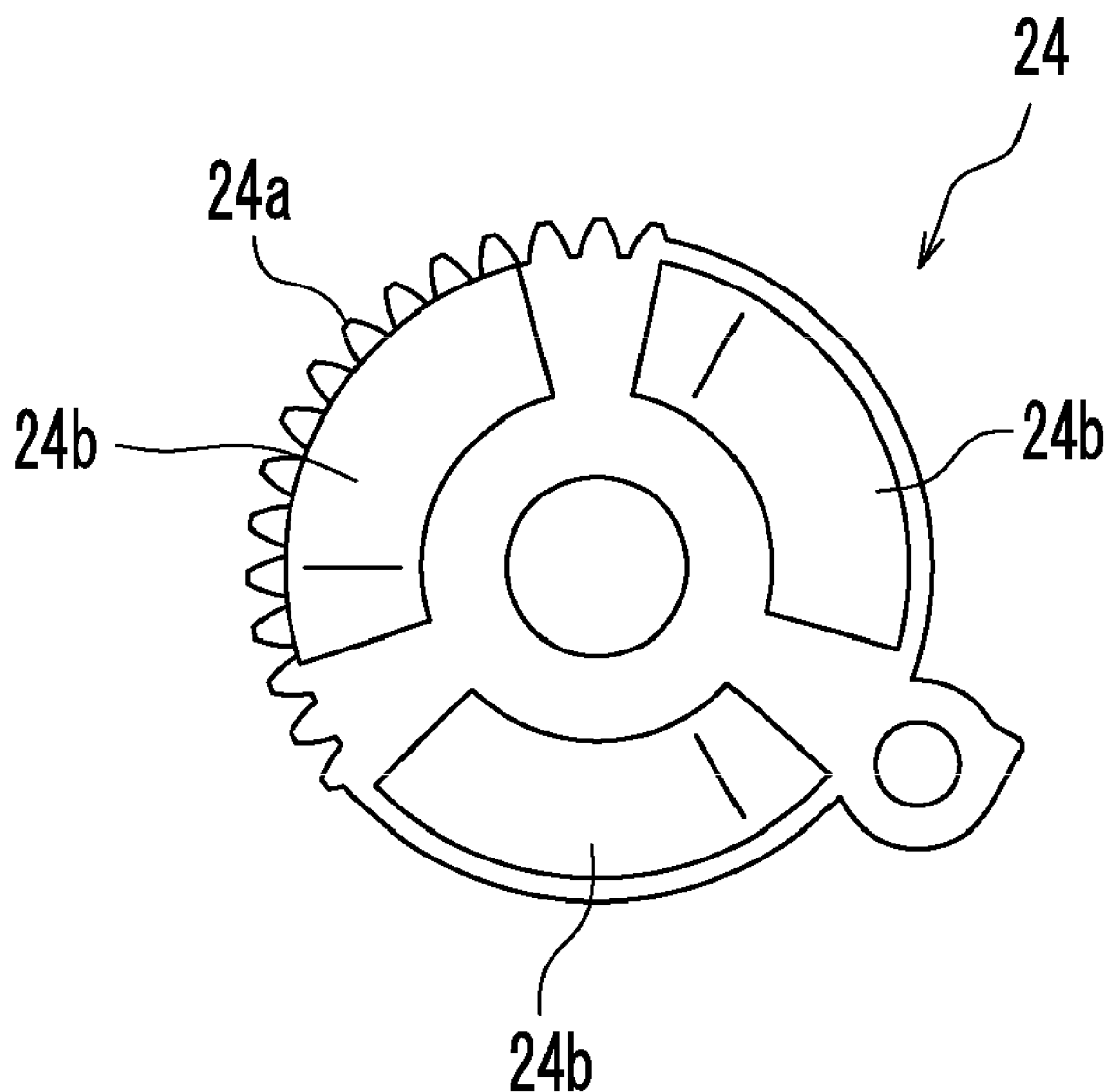
FIG. 9 is a cross-sectional view of a second solid of revolution of the drive force transmission mechanism.

As shown in FIG. 10, the second solid of revolution 24 is supported by a bearing 50 so as to be able to rotate around the slide shaft 455. On the other hand, the second solid of revolution 24 is arranged so as not to move in the axial direction of the slide shaft 455. As shown in FIG. 9, a plurality of teeth 24a are formed on an outer peripheral portion of second solid of revolution 24. The teeth 24a of second solid of revolution 24 are engaged with the teeth 19c1 of the gear portion 19c of the first solid of revolution 19 (see FIG. 7a). Accordingly, the first solid of revolution 19 and the second solid of revolution 24 are operatively connected with each other via the teeth 19c1 and the teeth 24a, respectively. Therefore, the torque of the first solid of revolution 19 is transmitted to the second solid of revolution 24.

Figure 7B:
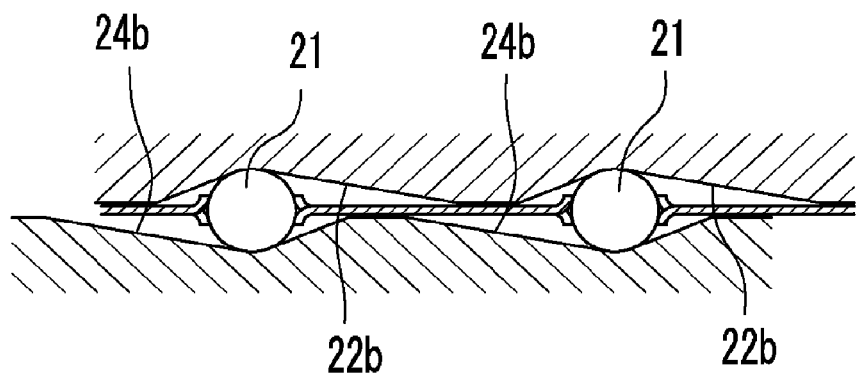
FIG. 7b is a schematic view which shows the positions of balls of a ball cam in a clutch engagement state.

Cam surfaces 22b, 24b, which are slanted along the circumferential direction, are respectively formed on the left side face (the upper side face in FIG. 7b) of the cam plate 22 and the right side face (the lower side face in FIG. 7b) of the second solid of revolution 24 (see also FIG. 9) to form a cam groove as shown in FIG. 7b. In this manner, the second solid of revolution 24 also functions as a cam plate. When the second solid of revolution 24 rotates, the relative position between the cam surface 22b of the cam plate 22 and the cam surface 24b of the second solid of revolution 24 is shifted. Consequently, the balls 21 climb and fall along the cam surfaces 22b, 24b. Accordingly, the cam plate 22 may be pushed to the right by the balls 21 and so as to slide rightward. Correspondingly, the slide shaft 455 also slides rightward and the pressure plate 451 also moves to the right. As a result, the clutch 11 is switched from an engaged state to a disengaged state.

As shown in FIG. 7a, in the present embodiment, an assist spring unit 25, which generates an assist force that assists with disengaging the clutch 11, is operatively coupled with the drive force transmission mechanism 15. The assist spring unit 25 includes a substantially cylindrical first holder 25a, a substantially cylindrical second holder 25b, a compression coil spring 25c arranged between the first holder 25a and the second holder 25b, and an abutment portion 25d which is disposed at the top end of the second holder 25b. The abutment portion 25d abuts with the cam portion 19b of the abovementioned first solid of revolution 19, as illustrated in reference to FIG. 7a. The first holder 25a and the second holder 25b are urged away from each other the compression coil spring 25c. Because the second holder 25b is urged toward the abutment portion 25d by the compression coil spring 25c, the abutment portion 25d is urged into a pressed contact condition with the cam portion 19b of the first solid of revolution 19. In this manner, the abutment portion 25d and the cam portion 19b are operatively coupled without utilizing any fasteners such as bolts.

The bottom side of the first case 25a is pivotally supported by the crankcase 36. Therefore, the assist spring unit 25 is configured to be free to swing around a center pivot axis C3.

FIGS. 14a to 14d are schematic side views showing the assist spring unit 25 and cam portion 19 in various stages of abutment. The abutment portion 25d of the assist spring unit 25 has a first abutment surface S1 that is a curved surface. The first abutment surface S1 includes a first convex abutment surface S11 and a first concave abutment surface S12 which are convex and concave relative to the first solid of revolution 19, respectively. The cam portion 19b of the first solid of revolution 19 has a second, complementary abutment surface S2 abutting the first abutment surface S1 of the abutment portion 25d. The second abutment surface S2 includes a second convex abutment surface S22 and a second concave abutment surface S21, which are convex and concave relative to the abutment portion 25d.

As will be described hereinbelow, in a so-called "play area", the first convex abutment surface S11 abuts on the second concave abutment surface S21 according to the direction of rotation of the first solid of revolution 19. Thereafter, the first concave abutment surface S12 abuts on the second convex abutment surface S22. Reference numeral 29 (FIG. 14d) denotes an abutment structure in which the cam portion 19b of the first solid of revolution 19 abuts on the abutment portion 25*d* of the assist spring unit 25. In the first embodiment, abutment structure 29 is formed by the first abutment surface S1 of the abutment portion 25*d* and the second abutment surface S2 of the cam portion 19*b*.

Shift Change Operation

A shift change operation in the motorcycle 1 is performed as follows. First, the rider 100 operates the automatic transmission operation switch 136 or 137 (FIG. 2). Then, a control system (not shown in the figures) of the motorcycle 1 controls the clutch actuator 14 (FIG. 4) and the shift actuator 70 (FIG. 6). Accordingly, a series of operations of disengaging the clutch 11, changing the transmission gear of the transmission 43 and engaging the clutch 11 are performed.

Engagement/Disengagement Operation of Clutch 11

Next, the operation of disengaging and engaging the clutch 11 by the clutch actuator 14 is described.

Figure 11A:
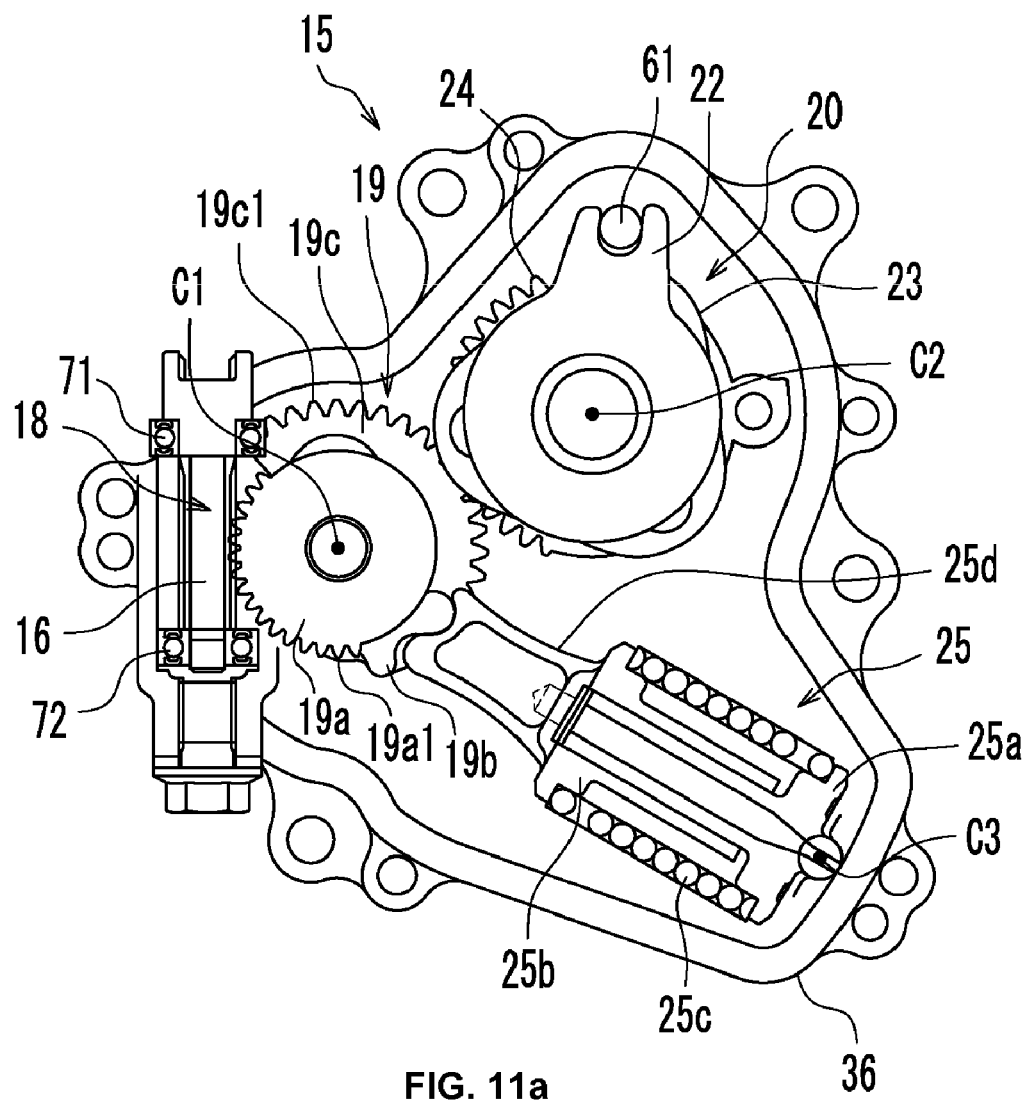
FIG. 11a is an enlarged side view of the drive force transmission mechanism when the clutch is in a disengagement start position.
Figure 12A:
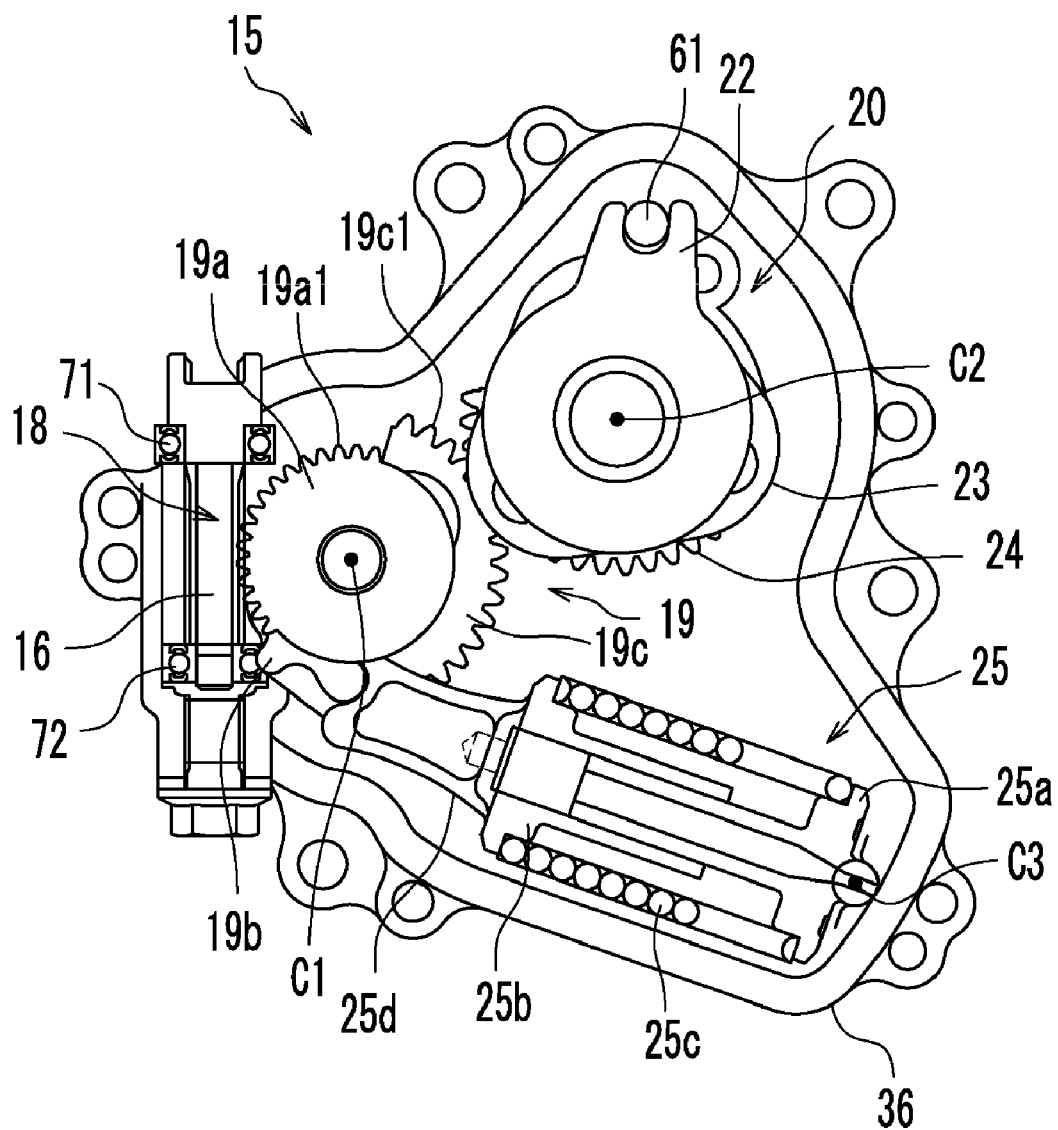
FIG. 12a is an enlarged side view of the drive force transmission mechanism of FIG. 7a when the clutch is in a disengaged state.

FIGS. 7*a*, 11*a*, and 12*a* are side views of the drive force transmission mechanism 15.

Figure 11B:
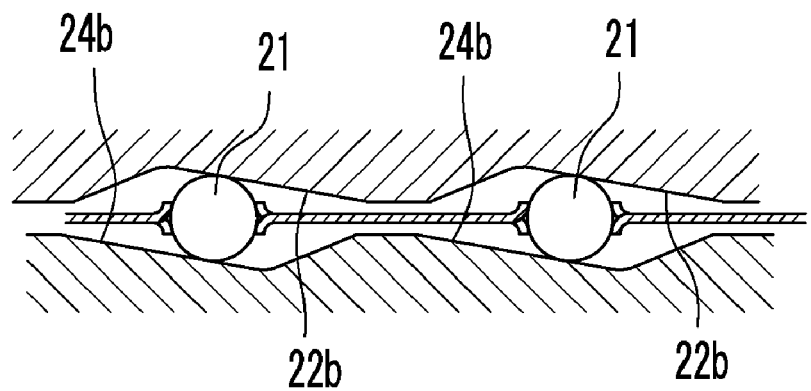
FIG. 11b is a schematic view which shows the positions of balls of a ball cam when the clutch is in a disengagement start state.

FIG. 7*a* shows a state in which the clutch 11 is engaged. FIG. 11 a shows a state in which the clutch 11 starts to be disengaged. FIG. 12*a* shows a state in which the clutch 11 is disengaged.

As shown in FIGS. 7*a* and 11*a*, when the clutch actuator 14 operates and the worm shaft 16 rotates, the first solid of revolution 19 rotates in the clockwise direction. Since the first solid of revolution 19 is engaged with the second solid of revolution 24, the second solid of revolution 24 rotates in the counterclockwise direction when the first solid of revolution 19 rotates in the clockwise direction. Here, the area from the position where the clutch 11 is engaged (the position shown in FIG. 7*a*) to the position at which the clutch 11 starts to be disengaged (the position shown in FIG. 11*a*, hereinafter referred to as "disengagement start position") is a so-called "play area." A heavy load is not applied to the clutch actuator 14 within the play area.

At the disengagement start position, the center pivot axis C3 of the assist spring unit 25, the abutment position at which the abutment portion 25*d* of the assist spring unit 25 abuts with the cam portion 19*b* of the first solid of revolution 19, and the axis of rotation C1 of the first solid of revolution 19 are aligned in a straight line (FIG. 11*a*). Therefore, the urging force of the assist spring unit 25 does not act as a force to rotate the first solid of revolution 19. That is, the assisting force of spring unit 25 is zero.

Figure 12B:
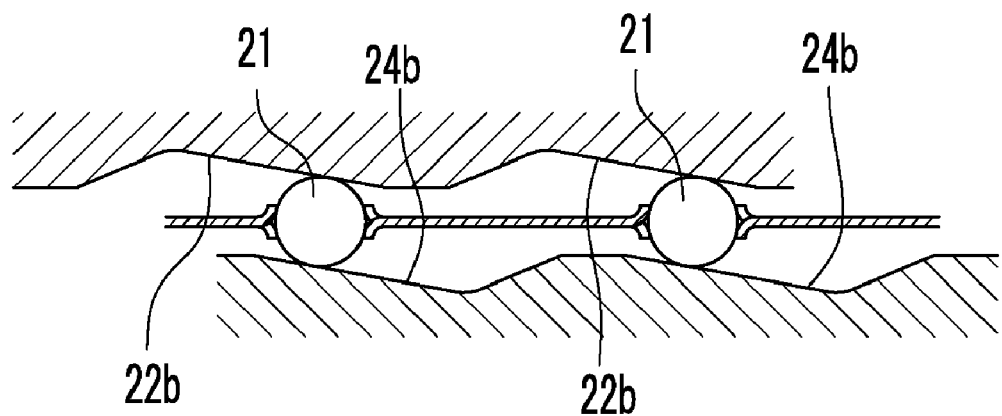
FIG. 12b is a schematic view which shows the positions of balls of the ball cam when the clutch is in a disengaged state.
Figure 13:
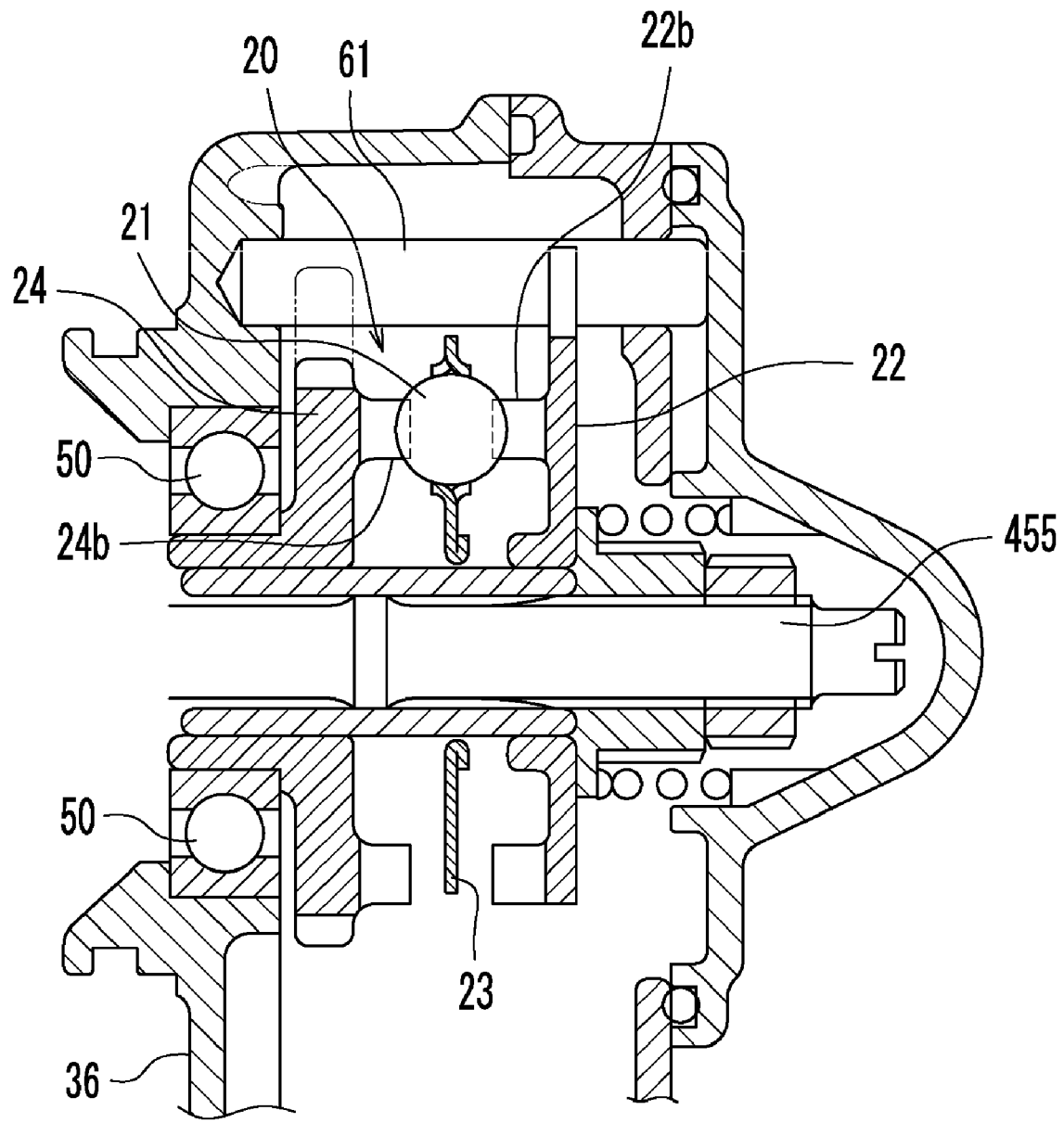
FIG. 13 is a cross-sectional view of the ball cam when the clutch is in a disengaged state.

When the worm shaft 16 rotates further from the disengagement start position, the first solid of revolution 19 rotates further in a clockwise direction. Moreover, following the rotation of the first solid of revolution 19, the second solid of revolution 24 further rotates counterclockwise. In this state, as shown in FIG. 12*b*, the balls 21 of the ball plate 23 of the ball cam 20 climb to some extent on the cam surface 22*b* of the cam plate 22 and the cam surface 24*b* of the second solid of revolution 24. As a result, the cam plate 22 is forced away from the second solid of revolution 24 by the balls 21 in the direction of disengaging the clutch 11. Specifically, the cam plate 22 is pressed toward a right side of the vehicle and moves rightward along with the slide shaft 455 (see FIG. 13). The pressure plate 451 thereby moves rightward to disengage the clutch 11.

As shown in FIG. 12*a*, when the first solid of revolution 19 rotates clockwise past the disengagement start position, the abutment position at which the abutment portion 25*d* of the assist spring unit 25 abuts with the cam portion 19*b* of the first solid of revolution 19 is deviated downward in FIG. 12*a* with respect to a line connecting the center pivot axis C3 of the assist spring unit 25 to the axis of rotation C1 of the first solid of revolution 19. Therefore, the urging force of the assist spring unit 25 acts as the force to rotate the first solid of revolution 19 clockwise, that is, as the assisting force for disengaging the clutch 11. The load on the clutch actuator 14 is thereby reduced.

The abovementioned generally describes the operation when the clutch 11 is disengaged. When the clutch 11 is to be engaged, the inverse operation to the above-mentioned operation is performed.

Manner of Abutment of First Solid of Revolution on Assist Spring Unit

The manner in which the cam portion 19*b* of the first solid of revolution 19 abuts with the abutment portion 25*d* of the assist spring unit 25 will next be described in detail.

As already mentioned, FIGS. 14*a* to 14*d* are schematic views showing the cam portion 19*b* of the first solid of revolution 19 and the abutment portion 25*d* of the assist spring unit 25 in various stages of abutment in accordance with the first embodiment of the present invention. Particularly, FIGS. 14*a* to 14*d* show clutch states which vary from the disengagement start position of the clutch 11 to a state of engagement of the clutch 11 in order of FIGS. 14*a*→14*b*→14*c*→14*d*. Conversely, if the clutch 11 is to be disengaged from an engagement state, states of the cam portion 19*b* and the assist spring unit 25 would change in order of FIGS. 14*d*→14*c*→14*b*→14*a*, and ultimately continue to the abutment position shown in FIG. 12*a*.

Figure 14:
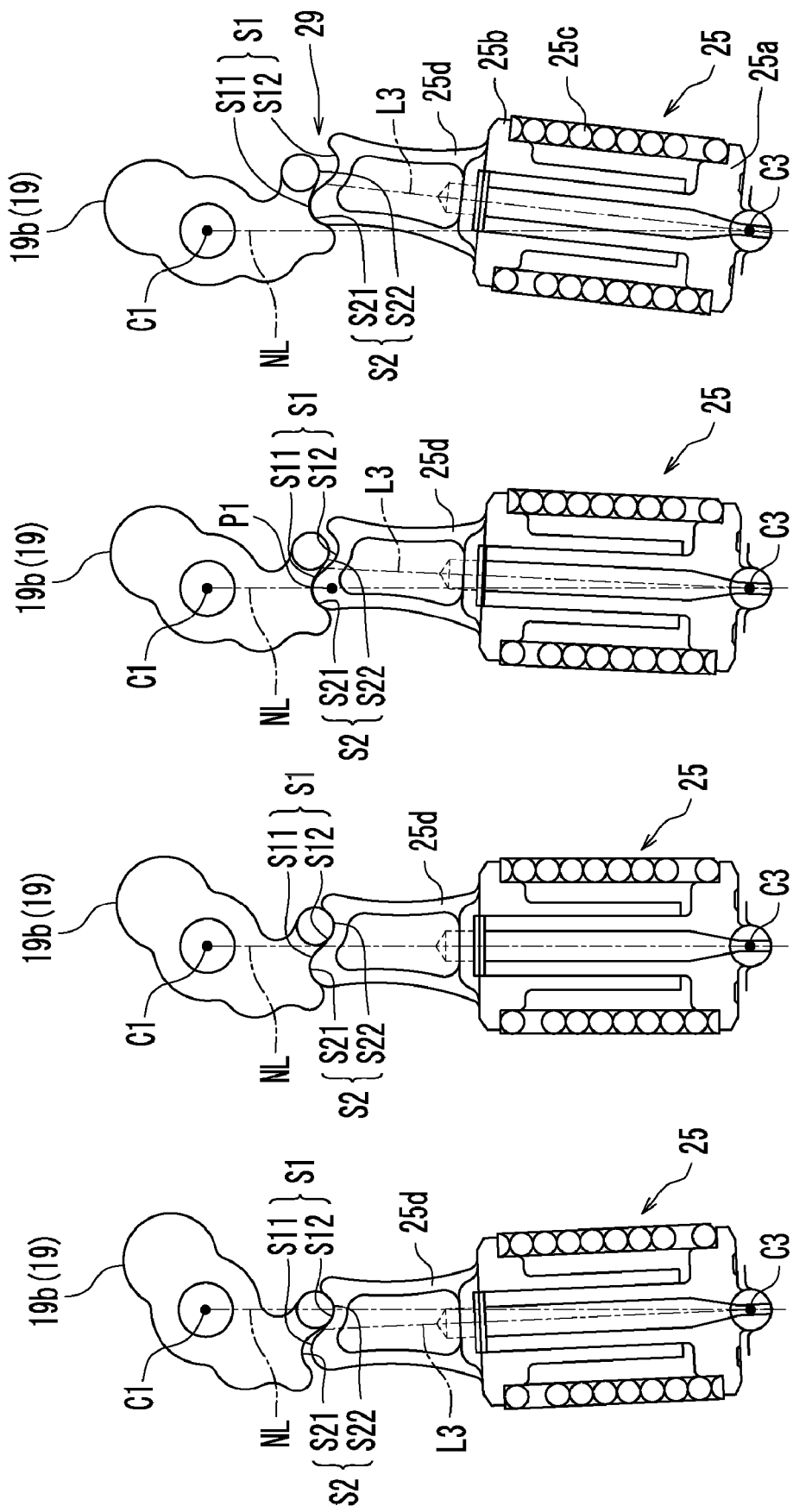
FIGS. 14a to 14d are schematic side views showing an abutment structure in which the first solid of revolution abuts an assist spring unit in various stages of abutment in accordance with a first embodiment of the present invention.
Figure 15:
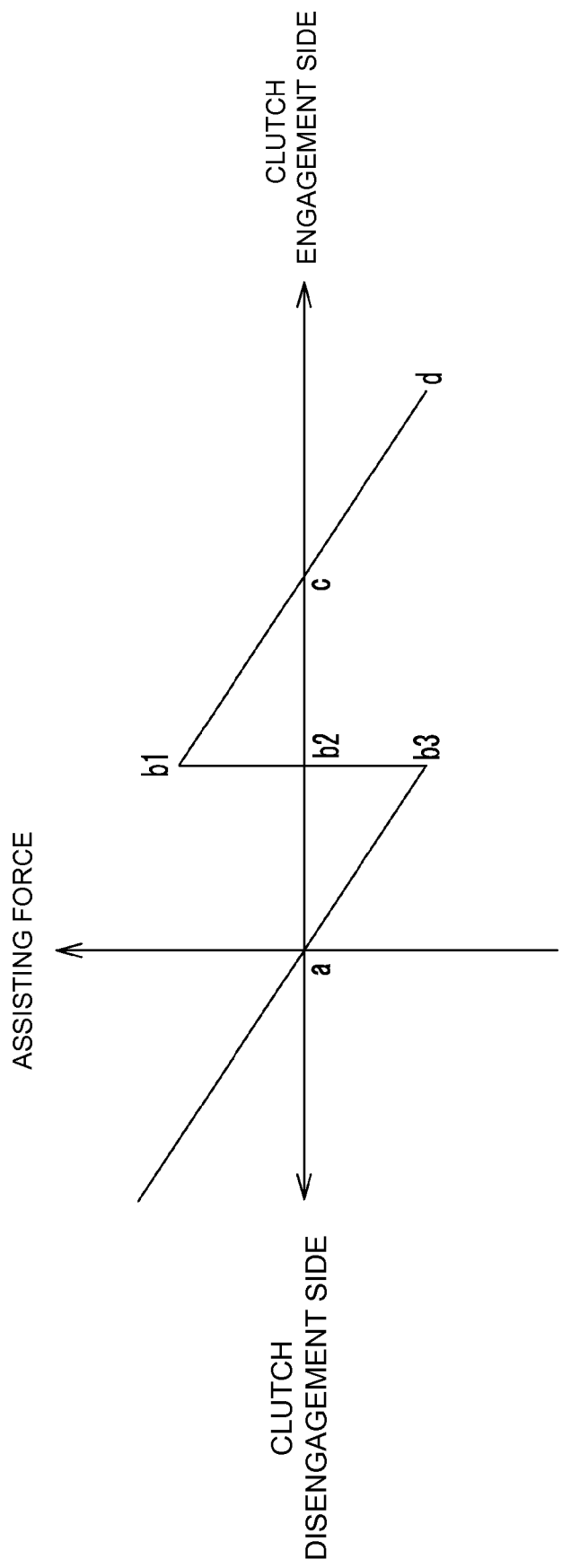
FIG. 15 is a graph showing the change in an assisting force generated by the assist spring unit in the various abutment positions illustrated in FIGS. 14a to 14d.

FIG. 15 shows how the assisting force transmitted from the assist spring unit 25 to the cam portion 19*b* changes direction and magnitude as clutch 11 transitions from one state to another. For purposes of the present specification, an assisting force acting in the direction of disengaging the clutch 11 will be referred to as a "forward assisting force," whereas an assisting force acting in the direction of engaging the clutch 11 will be referred to as a "reverse assisting force". In the graph of FIG. 15, a forward assisting force is indicated by force above the horizontal axis, while the reverse assisting force is indicated by a force below the horizontal axis. It is to be noted that the assisting force of the assist spring unit 25 is zero when the clutch 11 is at the disengagement start position (or meet point) shown in FIG. 14*a*.

In the following description, the line connecting the center pivot axis C3 of the assist spring unit 25 to the axis of rotation C1 of the first solid of revolution 19 is referred to as "neutral line NL". When the direction of the force acting on the cam portion 19*b* by the assist spring unit 25 (i.e. the direction of the force extending from the center pivot axis C3 toward the cam portion 19*b*, which shall apply hereafter) coincides with the neutral line NL, the assisting force of the assist spring unit 25 is zero. On the other hand, if the direction of the force acted on the cam portion 19*b* by the assist spring unit 25 is inclined rightward of the neutral line NL, the assisting force generated by the assist spring unit 25 is a reverse assisting force. Conversely, if the direction of the force acting on the cam portion 19*b* by the assist spring unit 25 is inclined leftward of the neutral line NL, the assisting force generated by the assist spring unit 25 is a forward assisting force.

As shown in FIG. 14*d*, i.e. the state in which the clutch 11 is engaged, the first convex abutment surface S11 of the abutment portion 25*d* abuts on the second concave abutment surface S21 of the cam portion 19*b*. In this state, the direction of the force acting on the cam portion 19*b* by the assist spring unit 25 is inclined rightward of the neutral line NL and the assisting force generated by the assist spring unit 25 is a reverse assisting force.

When clutch actuator 14 drives the clutch 11 to transition from an engagement state to a disengagement state, the first solid of revolution 19 rotates clockwise. Initially, the first convex abutment surface S11 of the abutment portion 25d continues to abut the second concave abutment surface S21 of the cam portion 19b while the abutment position moves toward the first concave abutment surface S12 and the second convex abutment surface S22 of the cam portion 19b. As a result, the direction of the force acting on the cam portion 19b by the assist spring unit 25 moves toward the neutral line NL and the reverse assisting force generated by the assist spring unit 25 gradually weakens (see transition from point "d" to point "c" in FIG. 15).

When the direction of the force acting on the cam portion 19b by the assist spring unit 25 coincides with the neutral line NL, the assisting force of the assist spring unit 25 becomes zero (see point "c" in FIG. 15). As shown in FIG. 14c, the center P1 of the first convex abutment surface S11 of the abutment portion 25d is located on the neutral line NL. Accordingly, the biasing force generated by the assist spring unit is necessarily coincident with the neutral line NL, and thus the assisting force is zero.

As the first solid of revolution 19 continues to rotate clockwise after the zero-assist-force state of FIG. 14c, the abutment position will move toward the first concave abutment surface S12 and the second convex abutment surface S22. However, the point of abutment will actually move to the left of the neutral line NL. Accordingly, the direction of the biasing force acting on the cam portion 19b by the assist spring unit 25 is inclined leftward of the neutral line NL with the degree of leftward inclination gradually increasing. As a result, the assisting force of the assist spring unit 25 becomes a forward assisting force with the forward assisting force gradually increasing (see transition from point "c" to point "b1" in FIG. 15).

When the first solid of revolution 19 further rotates clockwise, as shown in FIG. 14b, eventually the first convex abutment surface S11 of the abutment portion 25d will abut the second concave abutment surface S21 of the cam portion 19b and the first concave abutment surface S12 of the abutment portion 25d will simultaneously abut the second convex abutment surface S22 of the cam portion 19b. In this state, the direction of the biasing force acting on the cam portion 19b by the assist spring unit 25 instantaneously changes from the position where the direction is inclined leftward of the neutral line NL to the position where the direction coincides with the neutral line NL (FIG. 14b). As a result, the assisting force generated by the assist spring unit 25 instantaneously changes from a forward assisting force to zero (see transition from point "b1" to point "b2" in FIG. 15).

As the first solid of revolution 19 continues to rotate clockwise from the state shown in FIG. 14b, the first concave abutment surface S12 of the abutment portion will continue to abut the second convex abutment surface S22 of the cam portion 19b, but the first convex abutment surface S11 of the abutment portion 25d will separate from the second concave abutment surface S21 of the cam portion 19b. As soon as the first convex abutment surface S11 of the abutment portion 25d begins to separate from the second concave abutment surface S21 of the cam portion 19b, the point of abutment will instantaneously move to the right of the neutral line NL. Accordingly, the direction of the biasing force acting on the cam portion 19b by the assist spring unit 25 will also instantaneously change from a position where the direction coincides with the neutral line NL to a position where the direction is inclined rightward of the neutral line NL. As a result, the assisting force of the assist spring unit 25 instantaneously changes from zero to a reverse assisting force (see transition from point "b2" to point "b3" in FIG. 15).

Thereafter, if the first solid of revolution 19 further rotates clockwise, the first concave abutment surface S12 of the abutment portion 25d continues to abut the second convex abutment surface S22 of the cam portion 19b, but the point of abutment will move toward the neutral line NL. As a result, the direction of the force acting on the cam portion 19b by the assist spring unit 25 moves toward the neutral line NL and the reverse assisting force of the assist spring unit 25 gradually weakens (see transition from point "b3" to point "a" in FIG. 15).

At the disengagement start position or meet point shown in FIG. 14a, the direction of the biasing force acting on the cam portion 19b by the assist spring unit 25d coincides with the neutral line NL and the assisting force of the assist spring unit 25 is zero (see point "a" in FIG. 15).

If the first solid of revolution 19 further rotates counterclockwise past the disengagement start position, as shown in FIG. 12a, the abutment position at which the abutment portion 25d of the assist spring unit 25 abuts with the cam portion 19b of the first solid of revolution 19 is deviated downward in FIG. 12a with respect to the line connecting the center pivot axis C3 of the assist spring unit 25 to the axis of rotation C1 of the first solid of revolution 19 (i.e., the neutral line NL). Therefore, the biasing force of the assist spring unit 25 acts as a forward assisting force to rotate the first solid of revolution 19 clockwise. Further, as shown in FIG. 15, the assisting force gradually increases as the first solid of revolution 19 continues to rotate clockwise past the disengagement start position.

The manner in which the abutment point between the assist spring unit 25 and the first solid of revolution 19 changes when the clutch 11 is disengaged is described above. When the clutch 11 is to be engaged, the first solid of rotation is rotated counterclockwise and the inverse of the above operation is performed.

Advantages of the First Embodiment

As stated so far, and shown in FIG. 15, according to the first embodiment, the abutment structure 29 (in which the assist spring unit 25 abuts on the first solid of revolution 19) is configured so that the assisting force of the assist spring unit 25 does not act in the direction of rotating the first solid of revolution 19 at positions "b2" and "c" in the play area. Consequently, when compared with the conventional technique in which a reverse assisting force is generated in the entire play area, the reverse assisting force in the play area can be suppressed to a fairly low value on the average in the clutch drive device. Thus, it is possible to suppress the reverse assisting force in the play area without providing a canceling spring or the like as practiced conventionally and to lessen the load on the clutch actuator 14.

Furthermore, according to the first embodiment, the portion of the play area in which the assisting force of the assist spring unit 25 is a reverse assisting force, that is, the reverse assist area, and the portion of the play area in which the assisting force of the assist spring unit 25 is a forward assisting force, that is, the forward assist area, are mixed as shown in FIG. 15. Due to this, in the play area as a whole, the forward assisting force in the forward assist area cancels the reverse assisting force in the reverse assist area to some extent, thereby making it possible to suppress the reverse assisting force in the play area on the average.

According to the first embodiment, the assisting force changes in a complicated fashion in the play area (see FIG. 15). Due to this, if the vehicle 1 is a vehicle including a clutch 11 manually operated using a clutch lever or the like, the change in the assisting force will be transmitted to the rider via the clutch lever or the like, possibly impairing the rider's operational feel when operating the vehicle. According to the first embodiment, however, the clutch 11 is preferably driven by the clutch actuator 14. Due to this, the potential problem of impairing the rider's operational feel does not occur.

According to the first embodiment, the abutment structure 29 includes the first abutment surface S1 that is a curved surface formed on the abutment portion 25*d* of the assist spring unit 25 and the second abutment surface S2 that is a curved surface formed on the cam portion 19*b* of the first solid of revolution 19. Due to this, an abutment structure 29 that exhibits the above stated functions and advantages can thus be realized by a relatively simple configuration. While both the first abutment surface S1 and the second abutment surface S2 are curved surfaces in the first embodiment, they may also be bent surfaces.

Moreover, according to the first embodiment, the first abutment surface S1 includes the first convex abutment surface S11 and the first concave abutment surface S12, while the second abutment surface S2 includes the second concave abutment surface S21 and the second convex abutment surface S22. When the first solid of revolution 19 rotates clockwise while the first convex abutment surface S11 abuts on the second concave abutment surface S21, the assisting force generated by the assist spring unit 25 changes from a reverse assisting force to a forward assisting force (see transition from point "d" to point "c" to point "b1" in FIG. 15). Thereafter, when the first solid of revolution 19 rotates further clockwise, the first concave abutment surface S12 will eventually begin to abut on the second convex abutment surface S22. As a result, the assisting force of the assist spring unit 25 will change from a forward assisting force to a reverse assisting force (see transition from point "b1" to point "b2" to point "b3" in FIG. 15).

According to the first embodiment, the first abutment surface S1 and the second abutment surface S2 exhibiting the above-stated functions and advantages can be realized relatively easily. Furthermore, according to the first embodiment, at least one convex abutment surface is always abutting on at least one concave abutment surface. Thus, unlike the abutment of a convex abutment surface on a convex abutment surface, sliding between the abutment portion 25*d* of the assist spring unit 25 and the cam portion 19*b* of the first solid of revolution 19 is unlikely to occur. This makes it unlikely to generate deviations in the positions of the abutment portion 25*d* and the cam portion 19*b* relative to each other, thereby making it possible to stably attain the above-stated functions and advantages.

Furthermore, according to the first embodiment, as shown in FIGS. 14*a* to 14*d*, from viewpoint of the rotation axis direction of the first solid of revolution 19, an extension line L3 extending from the center pivot axis C3 of the assist spring unit 25 in an extension/compression direction of the compression coil spring 25*c* moves from one side to the other side across the neutral line NL in the play area.

When the direction of a reactive force which the assist spring unit 25 receives from the first solid of revolution 19 coincides with the extension line L3, a force causing the assist spring unit 25 to bend, that is, a force causing the first holder 25*a* and the second holder 25*b* to strike against each other, is not generated. However, when the direction of the reactive force does not coincide with the extension line L3, a force causing the assist spring unit 25 to bend is generated. In a clutch drive device 90 according to the first embodiment, the abutment position where the assist spring unit 25 abuts on the first solid of revolution 19 changes in a complicated fashion. Accordingly, such a bending force inherently tends to occur. Nevertheless, according to the first embodiment, the extension line L3 moves from one side to the other side across the neutral line NL in the play area, resulting in changes in the direction of the bending force acting on the assist spring unit 25. As a result, the average bending force in the play area as a whole is relatively small as compared to the instance in which the bending force acts only in one direction in the entire play area. As a result, the assist spring unit 25 operates smoothly. In addition, durability of the assist spring unit 25 is improved.

Moreover, according to the first embodiment, the first abutment surface S1 of the abutment portion 25*d* of the assist spring unit 25 and the second abutment surface S2 of the cam portion 19*b* of the first solid of revolution 19 are formed into curved surfaces so as to minimize friction forces at the time of abutment. As a result, the clutch drive device 90 operates more smoothly.

Second Embodiment

In the first embodiment, the reverse assist area and the forward assist area are mixed in the play area. In a second embodiment to be described hereinafter, an assisting force of an assist spring unit 25 is zero in an entire play area. Since the second embodiment is similar to the first embodiment in terms of configuration except for a configuration of the abutment structure 29, only the abutment structure 29 will be described.

Figure 16C:
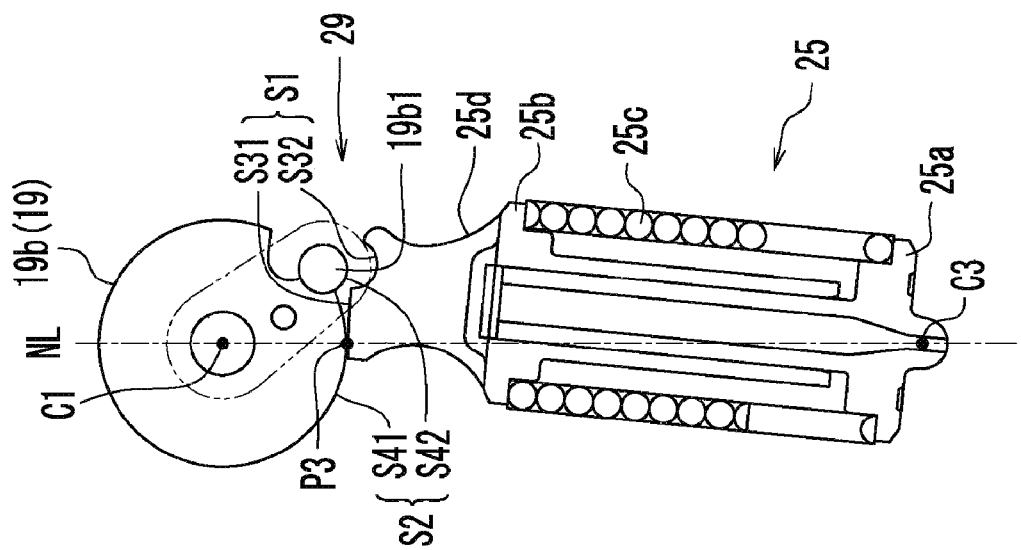
FIGS. 16a to 16c are schematic views showing an abutment structure in which a first solid of revolution abuts an assist spring unit in various stages of abutment according to a second embodiment.
Figure 16B:
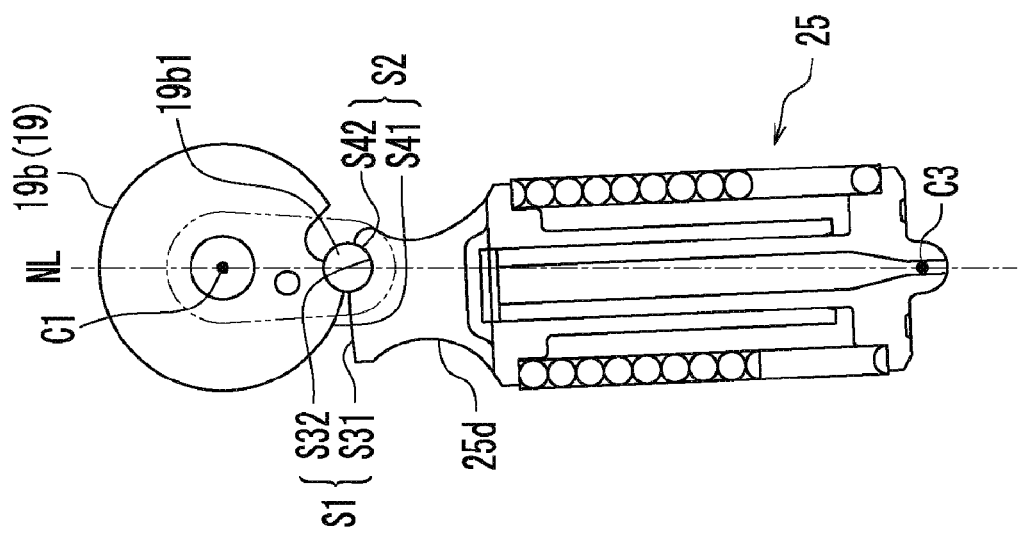
Figure 16A:
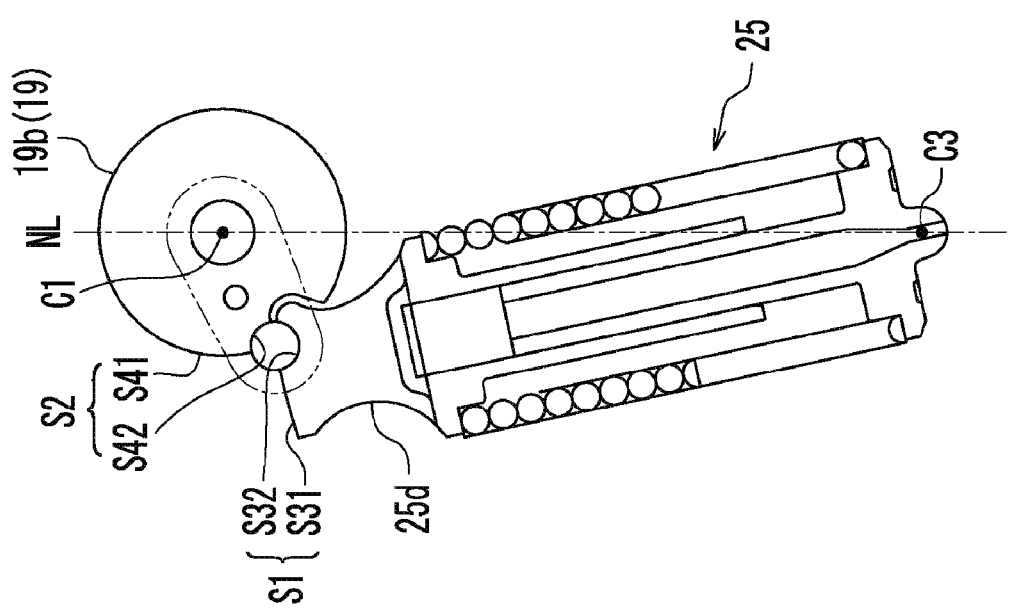
Figure 18A:
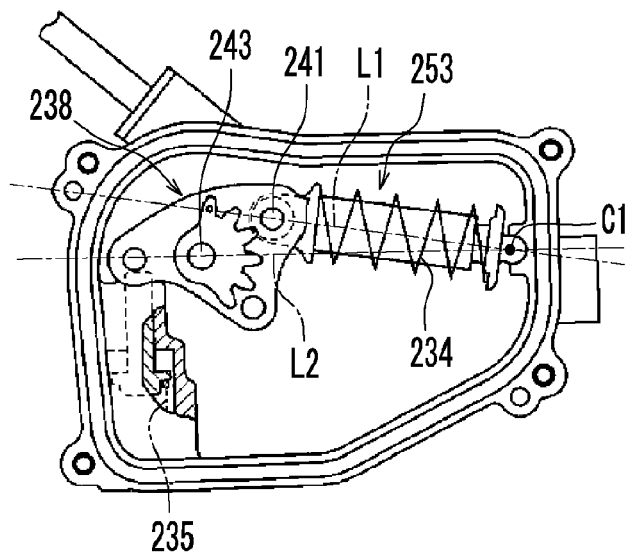
FIGS. 18a to 18c are configuration diagrams of a conventional clutch operation assisting device.
Figure 18B:
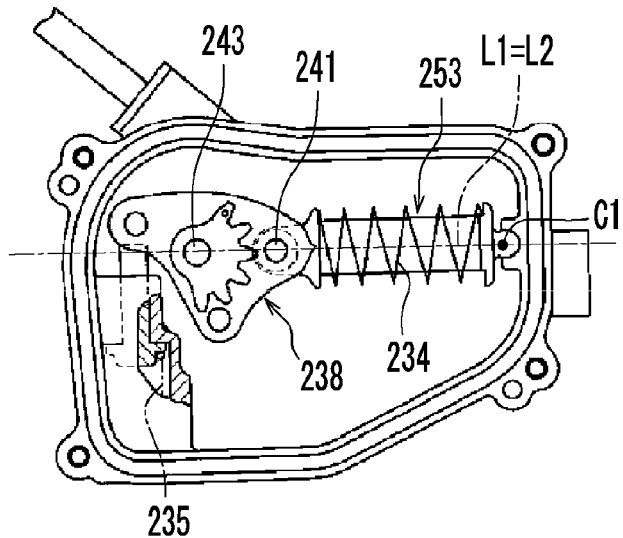
Figure 18C:
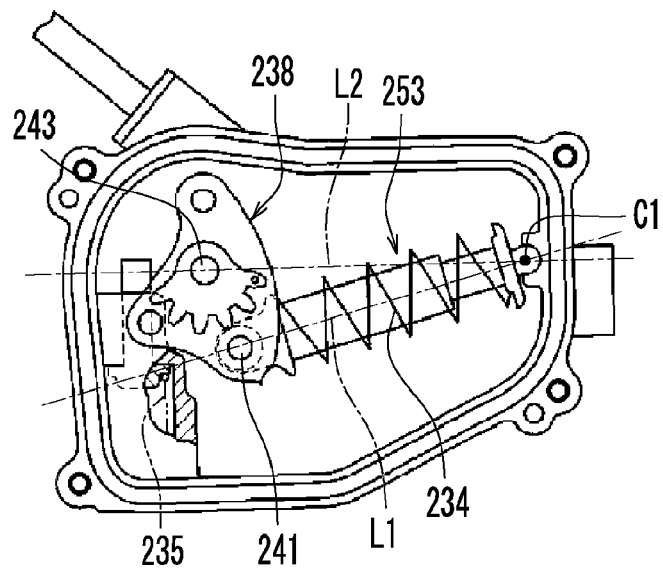

FIGS. 16*a* to 16*c* are schematic side views showing the abutment structure 29 in which the assist spring unit 25 abuts on a cam portion 19*b* of a first solid of revolution 19 according to the second embodiment. If a clutch 11 that is in an engagement state is to be disengaged, states of the cam portion 19*b* and the assist spring unit 25 change in order of FIGS. 16*c*→16*b*→16*a*.

In the second embodiment, a first abutment surface S1 of an abutment portion 25*d* of the assist spring unit 25 has a flat, smooth surface S31 and a concave arcuate-shaped surface S32. The cam portion 19*b* of the first solid of revolution 19 has a second abutment surface S2 which includes a large arcuate-shaped surface S41 concentric with the axis of rotation C1 and a small arcuate-shaped surface S42 constituting a part of a side surface of a cylindrical member 19*b*1.

As shown in FIG. 16*c*, if the clutch 11 is in an engaged state, the flat and smooth surface S31 of the abutment portion 25*d* abuts on the large arcuate-shaped surface S41 of the cam portion 19*b*. If a clutch actuator 14 drives the clutch 11 to change the state from the engagement state toward a disengagement state, the first solid of revolution 19 rotates clockwise. Initially, the flat and smooth surface S31 of the abutment portion 25*d* will continue to abut on the large arcuate-shaped surface S41 of the cam portion 19*b* and an abutment position P3 where the flat and smooth surface S31 abuts on the large arcuate-shaped surface S41 will always be located on a neutral line NL. Thus, the biasing force of the assist spring unit 25 does not act as a force for rotating the first solid of revolution 19 and the assist force is zero.

Thereafter, if the first solid of revolution 19 further rotates clockwise, the first solid of revolution 19 eventually reaches a disengagement start position as shown in FIG. 16*b*. Further, the flat and smooth surface S31 of the abutment portion 25*d* separates from the large arcuate-shaped surface S41 of the cam portion 19b and, instead, the arcuate-shaped surface S32 of the abutment portion 25d abuts the small arcuate-shaped surface S42 of the cam portion 19b. It is to be noted that even at this disengagement start position, the direction of the biasing force acting on the cam portion 19b by the assist spring unit 25 coincides with the neutral line NL. Consequently, the assisting force of the assist spring unit 25 remains zero.

If the first solid of revolution 19 exceeds the disengagement start position and further rotates clockwise as shown in FIG. 16a, the arcuate-shaped surface S32 of the abutment portion 25d continues to abut on the small arcuate-shaped surface S42 of the cam portion 19b but the direction of the biasing force acting on the cam portion 19b by the assist spring unit 25 is inclined leftward of the neutral line NL. As a result, the assisting force generated by the assist spring unit 25 becomes a forward assisting force for urging the first solid of revolution 19 clockwise. That is, the assist spring unit 25 assists the clutch actuator 14 in disengaging the clutch 11.

According to the second embodiment, the assisting force of the assist spring unit 25 is zero in the entire play area (that is, all areas from FIGS. 16c to 16b). Therefore, it is possible to prevent the reverse assisting force in the play area from occurring without providing a canceling spring or the like.

Third Embodiment

A specific configuration of the abutment structure 29 that makes the assisting force of the assist spring unit 25 zero in the entire play area is not limited to the structure of the second embodiment. For example, the abutment structure 29 may be configured as shown in FIGS. 17a to 17c.

In a third embodiment of the present invention, a first abutment surface S1 of an abutment portion 25d of an assist spring unit 25 has a toothed surface S51 on which a plurality of teeth are formed and a concave arcuate-shaped surface S52. Cam portion 19b of a first solid of revolution 19 has a mating toothed surface S61 configured to engage with the toothed surface S51 and a small arcuate-shaped surface S62 constituting a part of a side surface of a cylindrical member 19b1.

As shown in FIG. 17c, if clutch 11 is in an engaged state, the toothed surface S51 of the abutment portion 25d abuts on the toothed surface S61 of the cam portion 19b. In other words, the toothed surface S51 of the abutment portion 25d is engaged with the toothed surface S61 of the cam portion 19b. If a clutch actuator 14 drives the clutch 11 to change the state from an engagement state to a disengagement state, the first solid of revolution 19 rotates clockwise. While the toothed surfaces S51 and S61 remain in contact, the direction of the biasing force acting on the cam portion 19b by the assist spring unit 25 always coincides with a neural line NL. Due to this, the assisting force generated by the assist spring unit 25 is zero and thus the biasing force does not act as a force for rotating the first solid of revolution 19.

Thereafter, if the first solid of revolution 19 further rotates clockwise, the first solid of revolution 19 eventually reaches a disengagement start position as shown in FIG. 17b. Further, the toothed surface S51 of the abutment portion 25d separates from the toothed surface S61 of the cam portion 19b and, instead, the arcuate-shaped surface S52 of the abutment portion 25d abuts on the small arcuate-shaped surface S62 of the cam portion 19b. It is to be noted that even at this disengagement start position, the direction of the biasing force acting on the cam portion 19b by the assist spring unit 25 coincides with the neutral line NL. Due to this, the assisting force of the assist spring unit 25 remains zero.

If the first solid of revolution 19 exceeds the disengagement start position and further rotates clockwise as shown in FIG. 17a, the arcuate-shaped surface S52 of the abutment portion 25d continues to abut on the small arcuate-shaped surface S62 of the cam portion 19b but the direction of the biasing force acting on the cam portion 19b by the assist spring unit 25 is inclined leftward of the neutral line NL. As a result, the assisting force generated by the assist spring unit 25 becomes a forward assisting force for urging the first solid of revolution 19 clockwise. That is, the assist spring unit 25 assists the clutch actuator 14 in disengaging the clutch 11.

According to the third embodiment, the assisting force of the assist spring unit 25 is zero in the entire play area (that is, all areas from FIGS. 17c to 17b). Therefore, it is possible to prevent the reverse assisting force in the play area from occurring without providing a canceling spring or the like.

Other Modifications

In the first to third embodiments, the assist spring unit 25 comprises an auxiliary elastic body including the compression coil spring 25c. Alternatively, the auxiliary elastic body may include a spring other than the compression coil spring 25c. Further, the auxiliary elastic body may include an elastic member (such as a rubber member) instead of the spring 25c.

In the first to third embodiments, the clutch drive device 90 according to the present invention is mounted to the power unit of motorcycle 1. However, the vehicle according to the present invention is not limited to the motorcycle 1, but may be any other straddle-type vehicle, including, such as an ATV (All Terrain Vehicle). Furthermore, the vehicle according to the present invention may be a vehicle other than a straddle-type vehicle.

In the first to third embodiments, the number of solids of revolution of the drive force transmission mechanism 15 is two, that is, the drive force transmission mechanism 15 includes the first solid of revolution 19 and the second solid of revolution 24. However, the number of solids of revolution of the drive force transmission mechanism 15 may be one or three or more as needed.

As stated so far, the present invention is suitably used for a clutch drive device and a vehicle including the clutch drive device.

It is to be clearly understood that the above description was made only for purposes of an example and not as a limitation on the scope of the invention as claimed herein below.

What is claimed:
1. A clutch drive device, comprising:
a clutch;
an actuator generating a drive force for engaging or disengaging the clutch;
a drive force transmission mechanism for transmitting the drive force of the actuator to the clutch, the mechanism including a solid of revolution configured to rotate in a first direction when the clutch is being disengaged and a second, opposite direction when the clutch is being engaged; and
an auxiliary elastic body having a first end pivotally supported and a second end biased away from the first end and abutting on the solid of revolution via an abutment structure comprising abutting surfaces provided on the solid of revolution and the auxiliary elastic body, respectively, wherein the auxiliary elastic body urges the solid of revolution via the abutment structure in a direction of disengaging the clutch while the clutch transitions to a disengaged state from a meet point of the clutch, wherein a play area is positioned from where the clutch is engaged to the meet point; and wherein the abutment structure is configured so that a biasing force of the auxiliary elastic body does not act in a direction of rotating the solid of revolution at least at two positions or in the entire play area while the solid of revolution rotates in the play area in which the clutch is not disengaged.

2. The clutch drive device of claim 1, wherein the abutment structure is configured so that the play area includes a reverse assist area in which the urging force of the auxiliary elastic body acts in a direction of rotating the solid of revolution in the second direction and a forward assist area in which the urging force of the auxiliary elastic body acts in a direction of rotating the solid of revolution in the first direction.

3. The clutch drive device of claim 2, wherein the abutment structure includes a first abutment surface formed on the second end of the auxiliary elastic body and a second abutment surface formed on the solid of revolution, the second abutment surface configured to abut on the first abutment surface.

4. The clutch drive device of claim 3, wherein the first abutment surface includes first convex and concave abutment surfaces oriented toward the solid of revolution, and the second abutment surface includes second convex and concave abutment surfaces oriented toward the auxiliary elastic body.

5. The clutch drive device of claim 4, wherein when the solid of revolution rotates in the first direction in the play area, the first convex abutment surface abuts on the second concave abutment surface followed by the first concave abutment surface abutting on the second convex abutment surface.

6. The clutch drive device of claim 5, wherein when the solid of revolution rotates in the first direction while the first convex abutment surface abuts on the second concave abutment surface, the urging force of the auxiliary elastic body changes from a reverse assisting force for urging the solid of revolution in the second direction to a forward assisting force for urging the solid of revolution in the first direction, and thereafter when the solid of revolution rotates further in the first direction the urging force of the auxiliary elastic body changes substantially instantaneously from a forward assisting force to a reverse assisting force as the first convex abutment surface and second concave abutment surface separate and the first concave abutment surface begins to abut on the second convex abutment surface.

7. The clutch drive device of claim 3, wherein the auxiliary elastic body includes an extensible elastic member and an extensible holder having the first abutment surface and holding the extensible elastic member, the first abutment surface and the second abutment surface being formed so that an extension line extending from a pivotal center of the auxiliary elastic body in an extension direction of the extensible elastic member moves from one side to the other side across a neutral line connecting the pivotal center to a rotation center of the solid of revolution from a viewpoint of a direction of a rotation axis of the solid of revolution while the solid of revolution rotates in the first direction in the play area.

8. The clutch drive device of claim 3, wherein the first abutment surface and the second abutment surface are formed into curved surfaces that minimize the friction force when the first abutment surface abuts on the second abutment surface while the solid of revolution rotates in the play area.

9. The clutch drive device of claim 1, wherein the abutment structure is configured so that the urging force of the auxiliary elastic body does not act in the direction of rotating the solid of revolution in the entire play area.

10. A vehicle comprising the clutch drive device of claim 1.

11. The clutch drive device of claim 1, wherein the actuator includes a rotatable drive shaft.

12. The clutch drive device of claim 11, wherein the clutch includes a slide shaft which extends in a vehicle crosswise direction, the slide shaft having a central axis.

13. The clutch drive device of claim 12, wherein the drive force transmission mechanism includes a worm shaft coupled to the rotatable drive shaft.

14. The clutch drive device of claim 13, wherein the solid of revolution includes a worm wheel portion which engages the worm shaft.

15. The clutch drive device of claim 14, further comprising a second solid of revolution which rotates about the central axis of the slide shaft in accordance with rotation of the first solid of revolution.

16. The clutch drive device of claim 15, further comprising a ball cam which converts the torque of the second solid of revolution into a force in the axial direction of the slide shaft.

17. The clutch drive device of claim 16, wherein the second solid of revolution constitutes a part of the ball cam.

18. The clutch drive device of claim 16, wherein the ball cam includes a cam plate, a ball plate and the second solid of revolution.

19. The clutch drive device of claim 18, wherein the ball plate supports a plurality of balls arranged equidistantly in a circumferential fashion so as to be able to roll.

20. The clutch drive device of claim 1, wherein the abutment structure includes a first abutment portion on the auxiliary elastic body that includes a flat, smooth surface and a concave arcuate-shaped surface and a second abutment portion on a cam portion of the first solid of revolution that includes a first arcuate-shaped surface concentric with the axis of rotation of the first solid of revolution and a second arcuate-shaped surface, the second arcuate-shaped surface being smaller in diameter than the first arcuate-shaped surface.

21. The clutch drive device of claim 20, wherein the flat and smooth surface abuts on the first arcuate-shaped surface when the clutch is in an engaged state.

22. The clutch drive device of claim 21, wherein the first solid of revolution rotates clockwise when the actuator drives the clutch to transition from a state of engagement toward a state of disengagement.

23. The clutch drive device of claim 22, wherein the flat, smooth surface continuously abuts on the first arcuate-shaped surface of the cam portion when the first solid of revolution rotates clockwise.

* * * * *